United States Patent [19]

Anastas et al.

[11] 4,328,542

[45] May 4, 1982

[54] SECURE IMPLEMENTATION OF TRANSITION MACHINE COMPUTER

[75] Inventors: Mark S. Anastas, Auburn; Russell F. Vaughan, Enumclaw, both of Wash.

[73] Assignee: The Boeing Company, Seattle, Wash.

[21] Appl. No.: 91,877

[22] Filed: Nov. 7, 1979

[51] Int. Cl.³ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,562,717 | 2/1971 | Harmon et al. | 364/200 |
| 3,931,504 | 1/1976 | Jacoby | 364/200 |
| 4,087,856 | 5/1978 | Attanasio | 364/200 |
| 4,104,721 | 8/1978 | Markstein et al. | 364/200 |

OTHER PUBLICATIONS

Bell, D. E. and La Padula, L. J.; "Secure Computer Systems:Mathematical Foundations and Model", M74-244, The MITRE Corp., Bedford, MA, (Oct. 1974).
Bell, D. E., "Secure Computer Systems:A Refinement of the Mathematical Model", ESD-TR-73-278, vol. 3, (Apr. 1974).
Schiller, W. L., "The Design and Specification of a Security Kernel for the PDP-11/45", ESD-TR-75-69, The MITRE Corp., Bedford, MA, (May 1975).
Bell et al., "Secure Computer Systems:A Mathematical Model-Vol. II", AD-771 543, The MITRE Corp., Bedford, MA, (Nov. 1973).
Millen, J. K., "Security Kernel Validation in Practice", Comm. ACM, vol. 19, No. 5, (May 1976).
Schiller, W. L., "Design and Abstract Specification of a Multics Security Kernel", ESD-TR-77-259, vol. I, The MITRE Corp., Bedford, MA, (Nov. 1977).
Saltzer et al., "The Protection of Information in Computer Systems", Proc. of the IEEE, vol. 63, No. 9, (Sep. 1975), pp. 1278-1308.
Keller, R. M., ⇌Formal Verification of Parallel Programs", Comm. ACM, vol. 19, No. 7, (Jul. 1976), pp. 371-384.
Keller, R. M., "Parallel Program Schemata and Maximal Parallelism", J. ACM, vol. 20, No. 3, (Jul. 1973), pp. 514-537.
Keller, R. M., "Parallel Program Schemata and Maximal Parallelism", J. ACM, vol. 20, No. 4 (Oct. 1973), pp. 696-710.
Chroust, G., "Multiprocessing Scheduler", IBM Tech. Disc. Report, vol. 15, No. 5, (Oct. 1972), pp. 1643-1644.
Tangney, J. D., "Minicomputer Architectures for Effective Security Kernel Implementations", ESD-TR-7-8-170, The MITRE Corp., Bedford, MA, (OCT. 1978).
Burke, E. L., "Computer Security Technology", F-19628-78-C-0001, The MITRE Corp., Bedford, MA, pp. 1-5.
Lipner, S. B., "A Minicomputer Security Control System", The MITRE Corp., Bedford, MA, pp. 57-60.

Primary Examiner—Gareth D. Shaw
Assistant Examiner—Thomas M. Heckler
Attorney, Agent, or Firm—Schwartz, Jeffery, Schwaab, Mack, Blumenthal and Koch

[57] ABSTRACT

A secure implementation of a transition machine utilizing requirements oriented application programming and a hardware executive. The hardware executive is physically separate and protected from data processors executing the application programs and limits access authorization both for program execute and data read and write operations.

46 Claims, 20 Drawing Figures

FIG. 1

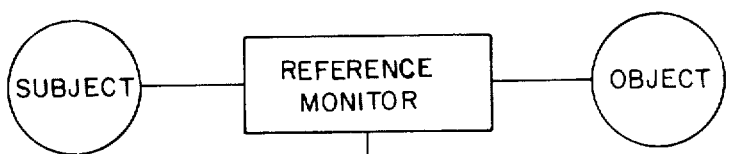

FIG. 2

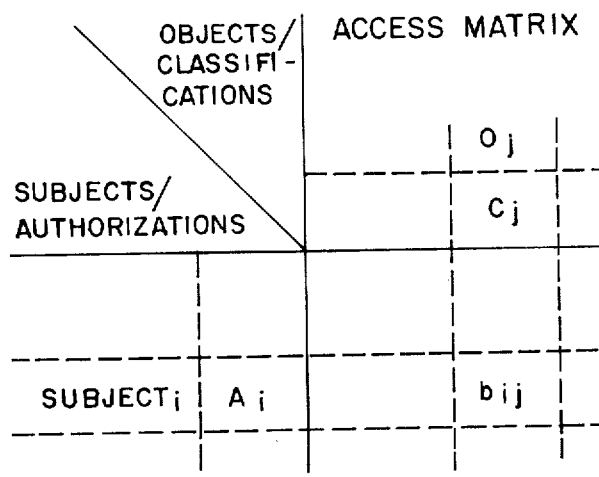

LEGEND:
- $A_i \equiv$ AUTHORIZATION OF SUBJECT$_i$
- $C_j \equiv$ CLASSIFICATION OF $O_j$
- $b_{ij} \equiv$ PERMITTED ACCESS
- $b_{ij} \equiv \begin{cases} \text{NULL} \\ \text{READ} \\ \text{WRITE} \\ \text{EXECUTE} \end{cases}$

FIG. 5

COMPONENTS OF TRANSITION MACHINE ARCHITECTURE

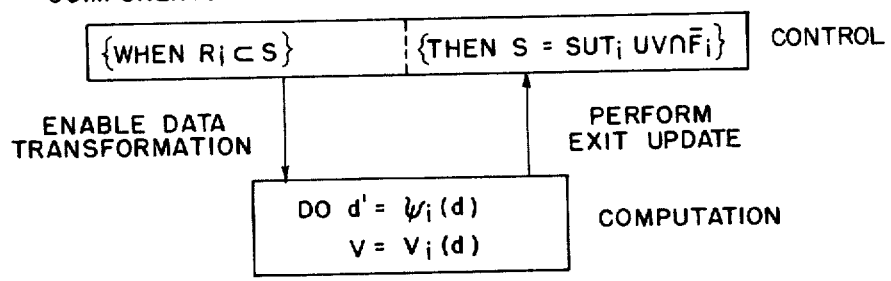

LEGEND:

- S = SET OF CURRENT STATUS CONDITIONS FOR EVERY EVENT DEFINED IN THE SYSTEM.
- $\psi_i$ = DATA TRANSFORMATION PERFORMED BY PROGRAM i.
- $R_i$ = SET OF ENTRY CONDITION EVENTS FOR PROGRAM i.
- $T_i$ = SET OF EVENTS TO BE SET TRUE UPON EXIT FROM PROGRAM i.
- $F_i$ = SET OF EVENTS TO BE SET FALSE UPON EXIT FROM PROGRAM i.
- $V_i$ = SET OF EVENTS TO BE SET VARIABLY BY PROGRAM i.

NOTE:

S, $R_i$, $T_i$, $F_i$, $V_i$ ARE ALL SETS OF ELEMENTS WITH THE SAME INDICES WHICH ARE TRUE OR FALSE.

LEGEND:
$S_j$ IS THE STATUS OF THE $j$th DATA CONDITION.
$R_{ij}$ INDICATES THE RELEVANCE OF DATA CONDITION $j$ TO ACTIVATING PROGRAM $i$.
$E_i$ IS THE ELIGIBILITY STATUS OF THE $i$th PROGRAM BASED ON THE STATUS OF EACH DATA CONDITION RELEVANT TO ACTIVATING PROGRAM $i$.

FIG. 13

REQUIREMENTS - ORIENTED PROGRAM

```
DECLARATIONS
    BOOLEAN  INITIALLY ("I"), PRODUCT.READY("0"),
             SUM.READY ("0"), CONTINUE.SUM ("0"),
             CONTINUE . PRODUCT ("0"), COMPUTE.ANSWER("0")
    INTEGER  COUNT, PRODUCT, SUM, SEC(20), CON(20)
    REAL     ANSWER, PROTECT

PGM 1: WHEN (INITIALLY) DO
        BEGIN:
           COUNT: = 0
           PRODUCT: = I
           SUM: = 0
        END
       THEN
           SET ( PRODUCT.READY, SUM.READY)
           RESET (INITIALLY)
PGM 2: WHEN (SUM.READY, PRODUCT.READY) DO
        BEGIN:
           COUNT: = COUNT + I
           CONTINUE.SUM: = COUNT ≤ 20
           CONTINUE.PRODUCT: = COUNT ≤ 20
           COMPUTE.ANSWER:= COUNT > 20
        END
       THEN
           RESET (SUM.READY, PRODUCT.READY)
PGM 3: WHEN (CONTINUE . PRODUCT ) DO
        BEGIN:
           PRODUCT: = PRODUCT * CON (COUNT)
        END
       THEN
           SET ( PRODUCT.READY)
           RESET (CONTINUE.PRODUCT)
PGM 4: WHEN (CONTINUE.SUM) DO
        BEGIN:
           SUM: = SUM + SEC(COUNT)
        END
       THEN
           SET (SUM.READY)
           RESET (CONTINUE.SUM)
PGM 5: WHEN (COMPUTE.ANSWER) DO
        BEGIN:
           ANSWER: = SUM/PRODUCT + PROTECT
        END
       THEN
           RESET (COMPUTE.ANSWER)
```

FIG. 14

CONTROL/DATA TRANSFORMATION DICHOTOMY

| NAME | CONTROL INFORMATION | DATA TRANSFORMATION |
|---|---|---|
| PGM 1: | WHEN (INITIALLY)<br>THEN<br>  SET ( PRODUCT . READY , SUM .<br>    READY )<br>  RESET (INITIALLY) | BEGIN:<br>  COUNT := 0<br>  PRODUCT := 1<br>  SUM := 0<br>END |
| PGM 2: | WHEN (SUM.READY, PRODUCT.<br>    READY)<br>THEN<br>  RESET (SUM.READY, PRODUCT.<br>    READY)<br>  SET VARIABLY (CONTINUE . SUM,<br>    CONTINUE . PRODUCT ,<br>    COMPUTE . ANSWER) | BEGIN:<br>  COUNT: = COUNT + 1<br>  CONTINUE . SUM := COUNT ≤ 20<br>  CONTINUE . PRODUCT :=<br>    COUNT ≤ 20<br>  COMPUTE . ANSWER := COUNT ><br>    20<br>END |
| PGM 3: | WHEN (CONTINUE . PRODUCT)<br>THEN<br>  SET ( PRODUCT . READY)<br>  RESET (CONTINUE . PRODUCT) | BEGIN:<br>  PRODUCT := PRODUCT *<br>    CON (COUNT)<br>END |
| PGM 4: | WHEN (CONTINUE . SUM)<br>THEN<br>  SET (SUM . READY)<br>  RESET (CONTINUE . SUM) | BEGIN:<br>  SUM := SUM + SEC (COUNT)<br>END |
| PGM 5: | WHEN (COMPUTE . ANSWER)<br>THEN<br>  RESET (COMPUTE . ANSWER) | BEGIN:<br>  ANSWER := SUM/PRODUCT +<br>    PRODUCT<br>END |

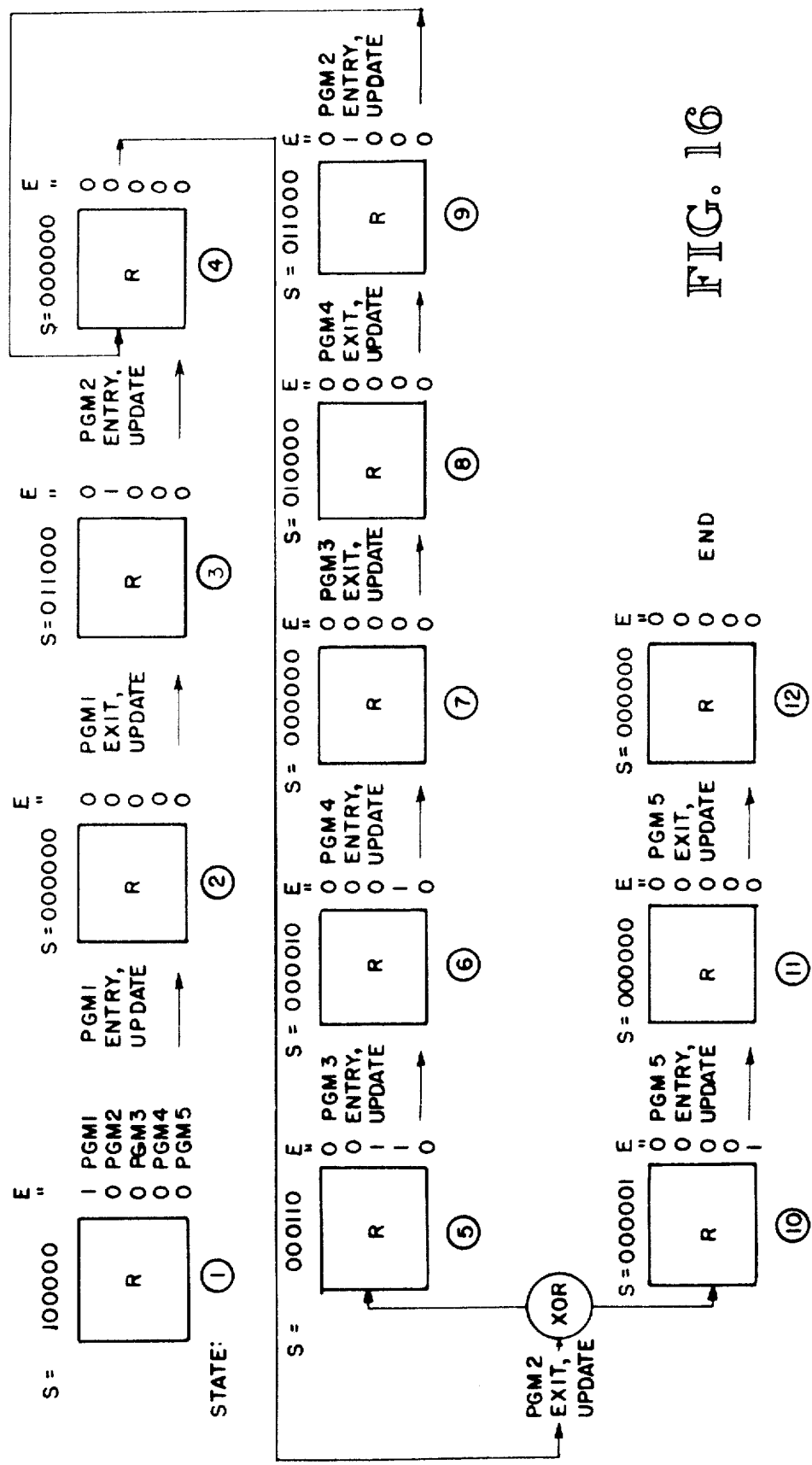

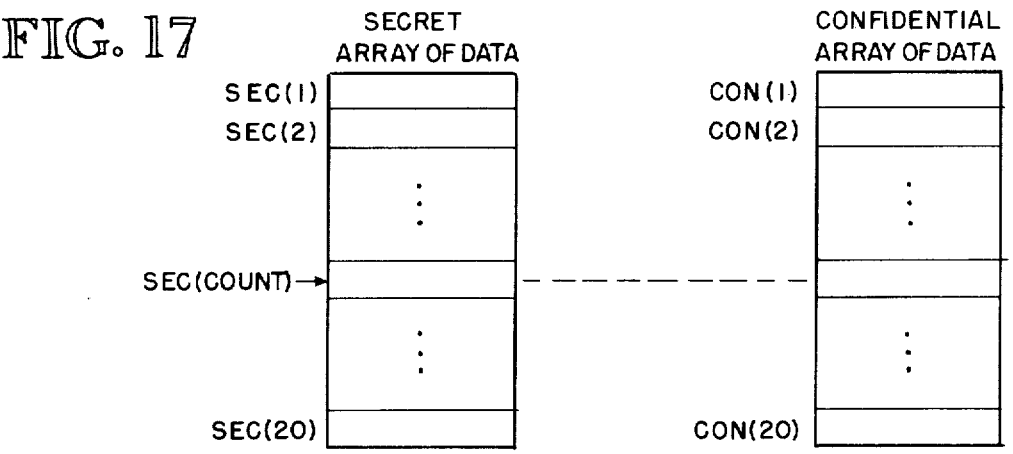

| SUBJECTS / AUTHORIZATIONS | OBJECTS / CLASSIFICATIONS | COUNT | SUM | PRODUCT | PROTECT | ANSWER | SEC | CON | PGM 1 | PGM 2 | PGM 3 | PGM 4 | PGM 5 |
|---|---|---|---|---|---|---|---|---|---|---|---|---|---|
| PGM 1 | S | W | W | W | | | | E | | | | | |
| PGM 2 | U | R/W | | | | | | | E | | | | |
| PGM 3 | C | R | | R/W | | | R | | | E | | | |
| PGM 4 | S | R | R/W | | | R | | | | | E | | |
| PGM 5 | S | | R | R | R | W | | | | | | E | |

FIG. 19

| SUBJECTS | OBJECTS | U | COUNT (READ TRUSTED) S | SUM (READ TRUSTED) C | PRODUCT (READ TRUSTED) S | PROTECT (READ TRUSTED) C | ANSWER S | SEC (READ TRUSTED) C | CON (READ TRUSTED) | TRUST REQUIREMENT |
|---|---|---|---|---|---|---|---|---|---|---|
| PGM 1 | | W | W | W | | | | | T | WRITE SUM, PRODUCT, COUNT |
| PGM 2 | | R/W | | | | | | | T | WRITE COUNT |
| PGM 3 | | R | | R/W | | | R | | T | WRITE PRODUCT |
| PGM 4 | | R | R/W | | | R | | | T | WRITE SUM |
| PGM 5 | | | R | R | R | W | | | T | WRITE ANSWER NO DOWNGRADE OF : SUM, PROTECT |

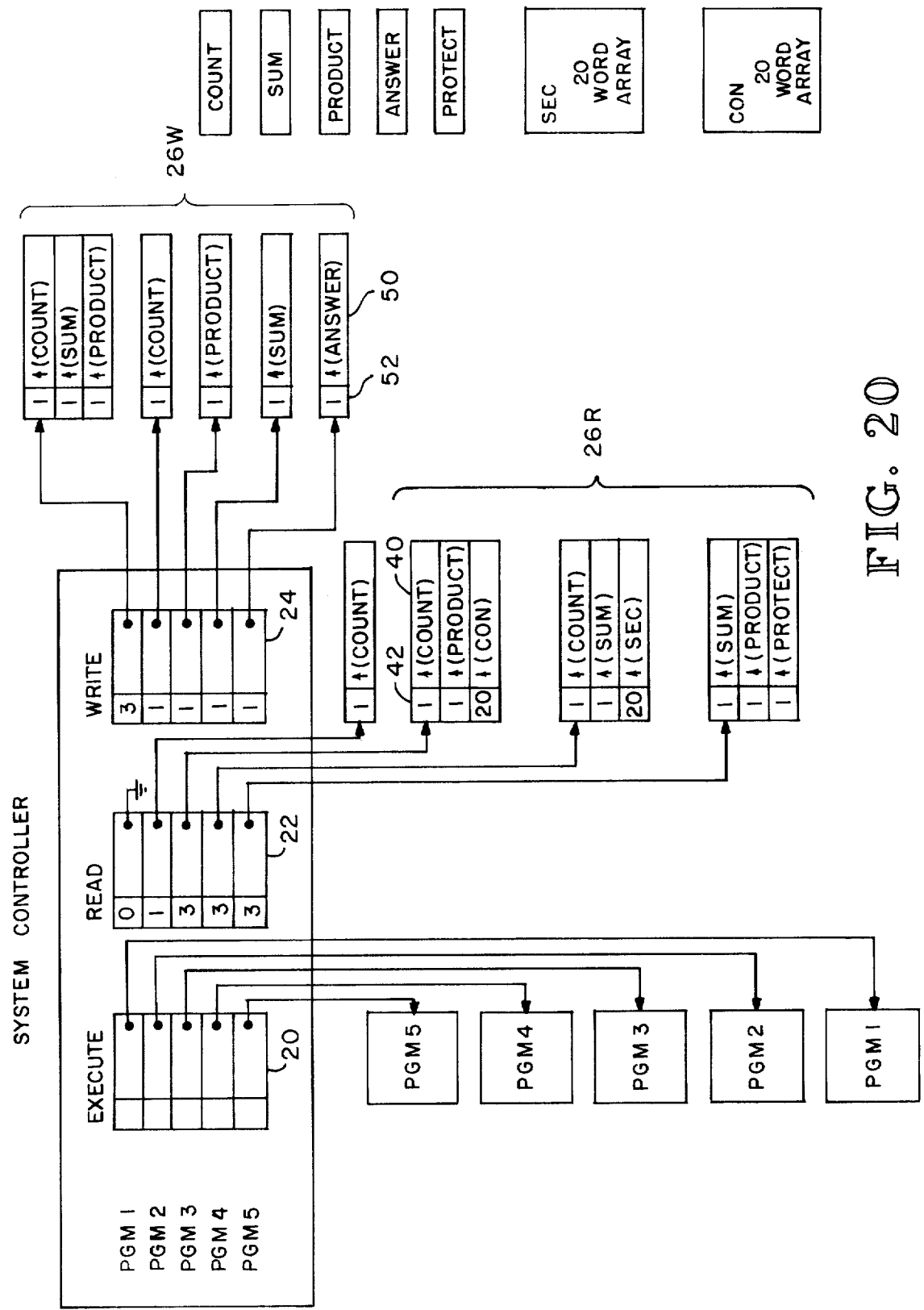

SECURE IMPLEMENTATION OF TRANSITION MACHINE COMPUTER

Field of the Invention
Description of the Prior Art
Summary of the Invention
Brief Description of the Drawings
Detailed Description of the Preferred Embodiment
  The MITRE Model
  Trust Requirements
  Requirements for Expanded Model of Security
  Applicability of Transition Machines System Overview Definition of Transition Machines
  Model of Parallel Programs
  Model of Transition Machine Architecture
  Procedure Eligibility Determination
  System Status Updating General Implementation Considerations System Controller Functional Operation-General Description
  Access Matrix Implementation-General Description
  Example Program
  Example Program Execution
  Access Matrix Implementation-Example Program
  Trust Identification
  Construct Assignments
  Example Secure Program Certification Procedure
  Justification of Trust
  Processor Firmware Verification
  Hardware Verification
APPENDIX A
APPENDIX B
APPENDIX C

BACKGROUND OF THE INVENTION

1. Field of the Invention

The invention is in the field of computer architecture and particularly in the area of Automatic Data Processing (ADP) security for both single and multiple processor configurations.

2. Description of the Prior Art

The need for security and/or privacy in ADP systems is well established. Secure multilevel ADP systems must accommodate data of various classifications and need-to-know categories without compromising the security of any of the system's capabilities, data items or interfaces. A breach of security could also be effected by denying access when such access is within security regulations and is essential to system performance.

The security requirement to restrict access on a need-to-know basis in addition to the actual military heirarchy of security classifications stems from the danger of using global knowledge at a given level to provide insight to the outline of plans and activities at the next higher classification level. This stringent requirement on military security makes it virtually impossible to satisfy the multilevel ADP problem by establishing separate machines for each separate category of data/program combination. The multilevel security problem presents basically the same technical requirements as the demand for privacy of information in commercially oriented systems.

A well-known security model has been developed by the MITRE Corporation in which mathematical proofs of "no compromise" can be obtained. The model is actually more of a tradition of the literature originating at and around the MITRE Corporation's System Architecture Group than directly associated with a specific reference. However, reference is made to the following documents:

Bell, D. E. and LaPadula, L. J., "Secure Computer Systems: Mathematical Foundations and Model", M74-244, The MITRE Corp., Bedford, Mass. (October, 1974)

Bell, D. E., "Secure Computer Systems: A Refinement of the Mathematical Model", MTR-2547-Vol-03, (April, 1974)

Millen, J. K., "Security Kernel Validation in Practice", Comm. ACM 19,5 (May, 1976)

Schiller, W. L., "The Design and Specification of a Security Kernel for the PDP-11/45", ESD-TR-75-69, The MITRE Corp., Bedford, Mass. (May, 1975)

This model is based on a restricted definition of security, proposed by the Department of Defense, which enables solution within conventional computer architectures. Security is, therefore, defined in the negative sense of the absence of compromise. "Compromise" consists of allowing a subject (i.e., user, program, process, etc.) access to data for which it is not authorized in the sense of the object (data, I/O interface, etc.) being more highly classified than its clearance or for which it has no established need-to-know. An example of compromise is the situation where a program, which is authorized to process and disseminate Secret messages, gains access to a Top Secret message. An example which avoids compromise but still constitutes a breach of security is the situation where a program processes data to effect some authorized function, but sets a condition which precludes execution of another program responsible for effecting another authorized data processing function.

Early attempts in implementing secure computer systems involved completely separate machines for each classification/need-to-know category, but such attempts require large amounts of idle hardware. They are also extremely inflexible when it comes to incorporating additional categories, in that a separate machine must be included for each contemporaneous category.

Solutions to the problem of security and/or privacy of ADP systems have been implemented using the MITRE model of security to determine the access privileges of the application programs. Such implementations provide a requirement for a reference monitor, or "security kernel" as it is typically called, to control resource access. The security kernel is an automated implementation of the security rules. This kernel must be isolated and protected to prevent unauthorized modification or tampering so that its continued integrity can be absolutely guaranteed. This security kernel allocates data and programs to separated processing environments based upon classification and clearance. This security kernel is almost exclusively a software implementation in conventional systems.

Descriptor-based machines of current vintage provide the capability of defining virtual machines within themselves which accommodate mutually exclusive access privileges as required by the model. These machines typically incorporate a three-state processor for kernel, supervisor and application program domains of operation. To facilitate the logical isolation of the three processing domains, memory mapping hardware is used which can be updated only in the kernel mode (to which the security kernel operations are allocated). Every data access to memory is then made with respect to this memory map. Typically, the memory mapping hardware divides the entire computer memory into pages of some fixed or specified variable length block size. Any given program can access only a specified subset of the total pages in the system, thereby restricting the access domain of the program. Hardware descriptor registers are utilized to define memory domains and to specify read and write authorization. Special hardware traps to the kernel mode are activated when memory access violations are attempted. An excellent tutorial article discussing the descriptor-based security approach may be found in Jerome H. Saltzer, et al., "The Protection of Information in Computer Systems", *Proc. of IEEE*, Vol. 63, No. 9, (Sept., 1975), pp. 1278-1308.

Numerous problems are encountered with these prior art approaches, including the following:

(1) An enlarged memory requirement exists due to fragmentation of the physical memory to allocate the data of the various classifications to fixed size pages. Even where fixed size pages are not required, the contiguity of data with common need-to-know categories presents data duplication requirements in some cases to avoid high overhead.

(2) Mapper set up overhead becomes very large where many registers are provided to give good data resolution. When the number of registers is reduced, more frequent mapper set up is required with commensurable overhead.

(3) The processors are complex because of the mapper requirements and the three state operating mode requirements. This adds to the initial cost of the hardware, and more significantly affects the certification problem of both the hardware and the software.

(4) The security kernel is not completely isolated in the sense of being physically separated from the user domain.

(5) The security kernel is implemented in software, and despite efforts made to keep it small, it is typically very large and difficult to certify.

(6) The application software which is controlled in such approaches is typically broken into large blocks. This is done to keep the program scheduling and mapper set up overhead low which would otherwise increase significantly as the number of program blocks increased. Because of the large program size, there will typically be many data accesses in each program which increases the likelihood of requiring access at more than one classification of data. This implies that a large percentage of processes may need the "trustedness" requirements as explained more fully below.

(7) The request-driven aspect of access authorization implies application program capabilities to assess the structure and status of the system. This provides a suitable environment for the exploitation of trojan horses.

(8) The programs which implement the application processes are written typically with large scope in a high level language. These programs are complied and/or assembled into the object code which actually gets executed by the machine. A detailed certification procedure is required in order to guarantee that the validity of the code which is ultimately implemented corresponds to the authorized access matrix. In this procedure, there are up to four levels of program translation which must be certified. It becomes virtually impossible to obtain the measure of security required for critical applications affecting national defense when this procedure is used.

(9) Denial-of-service is a serious threat to security which is not incorporated into the MITRE model or the DOD definition of security described previously. The central aspect of this problem is to assure that application program subsystems will be activated when appropriate and will not be activated in inappropriate situations. The request basis of conventional software structures makes this a particularly difficult threat to security in conventional computer architectures.

(10) Certification is another problem area which is inadequately treated in the MITRE model and which is also ill-suited for solution in conventional software structures where branching capabilities and request-driven access authorizations are generally allowed.

SUMMARY OF THE INVENTION

It is a broad objective of the invention to eliminate many of the problems and deficiences of the prior art by providing a highly secure computer system utilizing a unique computing structure integrated into a novel computer architecture.

Yet another general objective of the invention is to provide a software structure and mating hardware architecture to simplify verification and certification of software systems.

A further objective of the invention is to provide a computing system using a hardware system controller and data processor with a completely GO-TO-LESS and request-free programming structure for enabling simpler verification and certification of the computing system.

A further objective of the invention is to provide a computer system having a data processor and a separate hardware system controller for controlling protected access authorization registers utilized by the data processor for memory and I/O access. The I/O is implemented in a manner similar to the memory mapped I/O of the PDP-11 (Trademark of Digital Equipment Corp.) and other similar processors. The data processor instruction repertoire is limited to memory and I/O access only through the protected registers.

Another objective of the invention is to provide a low overhead access authorization hardware device which still permits extremely high data resolution. Single word data resolution is possible while still maintaining low overhead.

The objectives of the invention are achieved utilizing a unique computer architectural design which has hardware features particularly suited and tailored to improve on the capabilities of a security kernel implementation.

These objectives may be achieved in accordance with the principles of the invention by providing a hardware executive apparatus for use, for example, in a multiprocessor system. The multiprocessor system is operable for enabling a high degree of multilevel data security while controlling the operation of a plurality of data processors for solving an algorithm defined by a plurality of application programs and a control program. The plurality of data processors access application program memory storage means and data memory storage means including at least a common memory data area. Each of the application programs are stored in contiguous storage locations of the application program memory storage means and the hardware executive apparatus executes the control program and comprises a status storage means for storing global binary status indications S; corresponding to data conditions on a data set appropriate for determining eligibility of the application programs solving the algorithm. The stored status indications correspond to data conditions which are relevant for enabling execution of application programs by the plurality of processors utilized in solving the algorithm. The hardware executive further comprises relevance indication storage means for storing groups, i, of binary relevance indications $R_{ij}$, each group corresponding to the relevance of the status indications to the $i^{th}$ one of the application programs where i is an integer designating one of the groups and corresponding one of the application programs, and j is an integer designating one of the binary status indications. The hardware executive apparatus further comprises means for updating the status indications stored in the status storage means at the completion of execution of each application program and means responsive to the relevance storage means and the status storage means for determining the eligibility of the application programs for execution by the plurality of processors. Means are also provided for enabling execution of eligible application programs by the plurality of processors. The enabling means comprises (1) a plurality of execution address storage means for storing a starting address and program length indicator corresponding to each of the application programs, (2) a plurality of read pointer storage means for storing at least one read pointer address for each of the corresponding application programs, and (3) a plurality of write pointer storage means for storing at least one write pointer address for each of said corresponding application programs.

The invention may also be defined in reference to a computer system for providing high security for multilevel data wherein the computing system comprises at least one data processor, memory storage means for storing application programs having at least two different execute access authorization levels, memory storage means for storing the multilevel data, and a hardware system controller. Each application program is stored in contiguous memory locations of the application program memory storage means. The multilevel data has at least two different access authorization levels corresponding to the authorization levels of the application programs. The hardware system controller is separate from the data processor for providing sole access authorization for the data processor to the application program memory storage means and the multilevel data memory storage means. In the preferred embodiment, the system controller comprises a plurality of execution registers for storing program starting addresses for each of the plurality of application programs, a plurality of write registers for storing a write pointer for each of the application programs and a plurality of read registers for storing a data read pointer for each of the application programs.

The invention may also be defined as a method of increasing multilevel data security in a plurality of data processors or a uniprocessor. For example, the plurality of data processors form a computing system and the method comprises the steps of structuring the programming of an algorithm to be carried out by the computing system in a plurality of data transformation programs and a control program. The data transformation programs perform event-driven data computational steps without transfer of control to other data transformation programs and the control program schedules execution of the data computation steps. The method further involves selecting a plurality of unary predicates which collectively represent all data conditions relevant to enabling execution of all of the data transformation programs and forming status indications for the unary predicates. The method additionally involves designating all of the unary predicates which are relevant to enabling the execution of each of the data transformation programs to form a group of relevance indications corresponding to each data transformation program, storing the data transformation programs in memory storage means accessible by the plurality of data processors, storing the control programs in a hardware executive apparatus and scheduling the data transformation programs. Scheduling of the data transformation programs takes place by maintaining a memory store of the status indications, maintaining a memory store of each group of relevance indications, determining the eligibility of data transformation programs by hardware logic operations on the status and relevance memory stores wherein a data transformation program is determined eligible for execution if all status indications are true which are relevant in the group of relevance indications corresponding to the data transformation program, and enabling the eligible program, whereby concurrently eligible data transformation programs may be executed concurrently. The enabling steps include storing in storage means starting addresses (or an equivalent designation) corresponding to all of the data transformation programs, generating starting addresses from storage means corresponding to eligible transformation programs, transmitting the generated starting addresses to a protected execution register of a non-busy data processor, said protected execution register being read-only accessible by the non-busy processor, storing in storage means data pointer addresses (or an equivalent designation) for data read and write operations of the data transformation programs, generating data pointer addresses from the read and write storage means corresponding to eligible data transformation programs, and transmitting the generated data pointer read and write addresses to protected read and write registers of non-busy data processors. The protected read and write registers are read-only accessible by the data processors in an address determining mode of operation. The method further involves the steps of updating the memory storage of the status indications upon completion of execution of each data transformation program and repeating the eligibility determining step, the program enabling step and the updating step until data transformation programs are no longer determined eligible whereby the algorithm is completed by the computing system.

In accordance with another aspect of the invention, logic circuit means are provided for enabling updating of only selected elements of the status storage means to thereby mask-out modifications to elements which a terminating application program does not properly effect. This logic circuit means reduces the possibility of denial of service by deactivation of requisite status conditions for other programs by which they could be prevented from becoming eligible or inappropriately set eligible.

BRIEF DESCRIPTION OF THE DRAWINGS

These and other objects of the invention will become clear in reference to the foregoing description taken in conjunction with the drawings wherein:

FIG. 1 is a block diagram illustrating the overall conceptual basis of the security model;

FIG. 2 illustrates an access matrix utilized as a mathematical tool in describing the secure system model;

FIG. 5 is a mathematical representation of the major components and operation of the invention;

FIG. 13 is an example of a program listing illustrating requirements oriented programming techniques;

FIG. 14 is a table listing of control and data transformation programs corresponding to the requirements oriented programming technique of FIG. 13;

FIG. 16 is a flow diagram that shows the various system states of the data constructs during execution of the example program;

FIG. 17 illustrates data array formats for the example program of FIG. 13;

FIG. 18 illustrates the access matrix for the example program of FIG. 13;

FIG. 19 shows the trust requirements for the various programs corresponding to the example program of FIG. 13; and FIG. 20 shows the interrelationship of the system controller registers and data pointers for the example program of FIG. 13.

DETAILED DESCRIPTION OF THE PREFERRED EMBODIMENT

The MITRE Model

Figure 3:
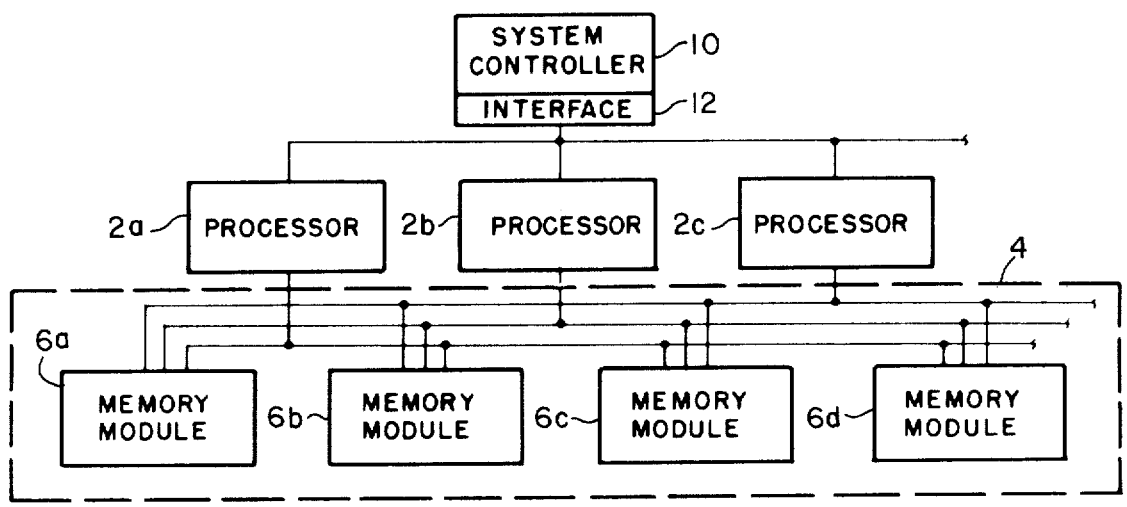
FIG. 3 is a block diagram of the transition machine in accordance with the invention.

FIG. 1 is a block diagram illustrating the overall conceptual basis upon which prior art abstract models of security are based. Subjects, such as users, programs in execution, etc., are associated with security authorizations or clearances. Objects, such as stored information data items, stored application program code, I/O interfaces, etc., are associated with classification levels. All access by subjects to desired objects must be made through an isolated and protected mechanism termed a reference monitor which is designed to guarantee security and privacy. Conceptually, the security kernel of the prior art is a hardware/software implementation of the reference monitor. In practice, prior art security kernel implementation has been almost exclusively of a software implementation.

The mathematical model developed by Bell & LaPadula (the MITRE model) is a reference monitor system defining objects, subjects and the allowed interactions between the two in terms of mathematical axioms controlling subjects' access to objects. A convenient tool utilized in describing these access laws is the access matrix set forth in FIG. 2.

The MITRE model provides a matrix of access authorizations, $b_{ij}$, allowed between subjects identified by subscript i and objects identified by subscript j. The rules, policed by a security kernel, which govern what programs can access which data items are provable relations which do not result in compromise. These relations may be derived from the model. Knowing the classification, including need-to-know, of all objects and the authorization of all subjects allows one to apply the rules and verify whether or not the entire system is free from compromise.

The permissible access categories of subjects to objects are READ, WRITE, and EXECUTE. The EXECUTE access assumes that each subject has an objective aspect (such as load module, I/O interface, etc.). The classification including need-to-know of the $j^{th}$ object is denoted $C_j$. The authorization of the $i^{th}$ subject is denoted $A_i$. The basic subject/object relation rules may now be stated as follows:

(1) To avoid the insertion of "trojan horse" programs which could dynamically redefine the system, WRITE and EXECUTE access privilege must be mutually exclusive.

(2) To avoid compromise for a static system, $A_i \geq C_j$ for all i and j in the system.

(3) The simplest case (in the sense of even purposeful attempts by subject i to compromise security being futile) is the case where $A_i = C_j$. The subject i is granted no capability in this case of inappropriately downgrading data.

(4) For cases where $A_i > C_j$ is required, it can only be because subject i must (at some time during its execution) have access to objects at a higher level as well. In this situation, subject i has the capability of inappropriately downgrading information; it must, therefore, be "trusted" not to do so. The so-called "*-property" stipulates that a subject cannot write into an object classified at a lower level than the highest authorization of the subject. Violation of the *-property requires the violating subject to be write-trusted not to downgrade data inappropriately.

Trust Requirements

In accordance with the principles of the invention, families of trust can be defined among the subjects, based upon their reading trusted data which a predecessor program has been trusted to write such that it does not contain data derived inappropriately from a more highly classified source. An access matrix between subjects and objects may be set up as in the MITRE model. A first pass through the access matrix is made and each row is inspected to see which programs, if any, violate the *-property. These programs must be "write-trusted" not to downgrade or mix data inappropriately. Data items within these programs must then be identified which are inputs to these programs and might contain coded information that could be downgraded (mixed) without the trusted program being able to avoid it. The columns in the access matrix associated with these data items are then identified as being "read-trusted". When the read-trusted and write-trusted relationships have been identified for all rows in the matrix, another pass is made through the matrix to identify which programs write previously identified read-trusted data. These programs are then identified as write-trusted for the specific data requiring trust. The entire process is repeated until a pass is made through the access matrix with no further read-trust being identified. At this point, the trust identification process is completed.

Requirements for Expanded Model of Security

In accordance with the invention, all of the above security issues can be incorporated into an integrated model against which real systems may be compared. The specific threats to security that would be included in such a model at the subsystem level are the following:

(1) Extraneous downgrading of data by a subject;
(2) Extraneous upgrading of data by a subject;
(3) Extraneous or insufficient subject activation conditions;
(4) Extraneous control paths;
(5) Extraneous or insufficient subject termination conditions; and
(6) Erroneous data transformations by trusted subjects.

Conventional computer architectures are not well suited at meeting these requirements. However, the transition machine architecture described herein provides unique capabilities in all of these expanded secure ADP areas.

APPLICABILITY OF TRANSITION MACHINES

The multilevel secure capabilities of the invention are achieved by utilizing a novel computer architecture which is set forth in detail in copending application Ser. No. 38,292, filed May 11, 1979, and entitled "Transition Machine-A General Purpose Computer", the whole of which application is incorporated herein by reference. For ease of description, the general aspects of the transition machines are set forth hereinafter while the more detailed hardware description may be found in reference to the above-mentioned copending application. As emphasized in the aforementioned copending application, the transition machine architecture permits a high degree of concurrent program operation and an enhanced throughput in both uniprocessor and multiprocessor embodiments. For purposes of the invention described herein, the transition machine architecture is particularly effective in supporting a directly verifiable program structure. Enhanced security is provided by a physical separation of the control and data transormation aspects of the computation both in the software and at the architectural level of the machine. The software structure complementing the transition machine architecture is set forth below together with development of the access matrix and trust identification requirements utilizing an example program.

SYSTEM OVERVIEW

Definition of Transition Machines

The family of computational machine architectures described herein implements a completely general model of event-driven computation. An overall block diagram of a computing system or, as termed herein a transition machine as made in accordance with the invention is shown in FIG. 3. The transition machine is seen to comprise a plurality of processors 2a, 2b, 2c each connected to a common memory 4. While only three processors are shown, it is understood that a large number of processors may be used including I/O controllers and other special purpose processors. Further, the common memory 4 is typically composed of a plurality of memory modules 6a, 6b, 6c, 6d of which only four are illustrated. Each memory module may provide storage means for data as well as for application programs, or additional memory modules may be provided for such purposes as desired. For the multiprocessor embodiment, however, at least some data storage areas are made commonly accessible to the plurality of data processors. It is also understood that some of the processors may in fact be I/O processors or controllers connected in conventional fashion to one or more I/O devices.

A System Controller 10 is shown connected to the processors 2 via a processor/system controller interface 12. The System Controller 10 forms the heart of the invention and is more fully described hereinafter. In practice, the processors 2 and common memory 4 may be of conventional hardware design. The System Controller 10 is utilized, together with interface 12, to dispatch activities to the processors 2 and to achieve concurrent operation of the processors 2, in a multiprocessor system. The System Controller 10 is thus similar in function to a multiprocessor software system executive, but has the advantage of extremely low overhead.

Model of Parallel Programs

The abstract conceptual model of parallel computation is set forth for example in a number of articles by Robert M. Keller e.g. "Formal Verification of Parallel Programs", Comm. ACM 19, 7 (July 1976) pp 371-384; "Parallel Program Schemata and Maximal Parallelism", J. ACM 20, 3 (July 1973), pp, 514-537; and J. ACM 20, 4 (Oct. 1973), pp 696-710.

The conceptual model has been termed a transition system and is accepted as the basis for the more detailed architectural model set forth herein. A transition system is a model of the run time structure for computer programs; it is a form into which any "structured" program can be converted directly by a compilation process. The transition machine provides a machine architecture in which transition systems can be executed.

The transition system model is defined as $(Q, \rightarrow)$, where $Q$ is the set of possible systems states and $\rightarrow$ is the set of transitions between states as described by Keller. A named transition system is a triple $(Q, \rightarrow, \Sigma)$. The components correspond respectively to the set of all possible system states $(q_1, q_2, q_3 \ldots)$, a set of all transitions between states $(\rightarrow_1, \rightarrow_2, \rightarrow_3, \ldots)$, and a set of names $(\sigma_1, \sigma_2, \sigma_3, \ldots)$ associated with groups of individually programmed transitions between states. Since there is a one-to-one correspondence between the indices on sigma and the names themselves, the indices can be used to indicate the names: $i$ implies $\sigma_i$, and $I \equiv \{i\}$ implies $\Sigma$. The index $i \sigma I$ is associated with a group of system transitions described by the statement:

when $R_i(d) do\ d' = \psi_i(d)$

The symbols in this statement are defined as follows:

i = the index of the group of transitions whose common feature is that they all result in the data transformation indicated by the function $\psi_i$ d = the set of all data items in the system $R_i(d)$ = the subset of satisfied propositions on the data set, d which are essential to defining the appropriateness of transitioning as determined by performing the data transformation $\psi_i(d)$.

$\psi_i(d)$ = the programmed functional data transformation (referred to as a subsystem herein) associated with the group of system transitions indicated by i which operates on the data set, d and results in a revised data set d'.

The set i represent procedures (including enabling predicate) that can be written by a programmer to effect transformations $\psi_i$ on the data set d when the appropriate set of conditions $R_i$ is satisfied on that data set. The $\psi_i$ are the individual program subsystems which constitute a computer program. In a parallel computation step multiple sets of conditions $R_i$ are satisfied simultaneously such that multiple subsystems can be executed in parallel. $R_i$ is an enabling predicate that indicates the requisite status of the data set which properly enables the execution of the subsystem which performs the transformation, $\psi_i$. Each of the enabling predicates $R_i$ is made up of a set $R_{ij}$, $j \in J$ of unary predicates where J is the total number of unary predicates required by the entire algorithm or computation problem. A unary predicate may be defined as a single proposition on the data set and thus represents a single data condition whose value may be specified by a binary indication, e.g. true or false. Propositions which are examples of unary predicates on the data elements $e_{j\epsilon}$ d are the following:

(1) the data element $e_j$ is available/not available for use in subsequent computations, (2) the data element $e_{j1}$ satisfies/does-not-satisfy a specified relation to some constant or other data element $e_{j2}$ (for example, $e_{j1} < e_{j2}$), and (3) the data element $e_j$ can/cannot be updated.

The implementation of the conceptual model is carried out by reducing control over transitions between states to a mechanical operation. To achieve such control the set of states, Q is restricted such that only those which may imply a different set of eligible subsystems are considered to be unique. In making this restriction any particular state q can be signified by a set of binary status indications on a global set of unary predicates. The global set of unary predicates is restricted to include only those which are relevant to the eligibility of defined subsystems, i.e., the status of the data condition $a > b$ will be a significant part of q if and only if the condition $a > b$ is relevant to the eligibility of some subsystem, i.

Model Of Transition Machine Architecture

FIG. 5 shows a general characterization of the model of the transition machine architecture which implements the desired characteristics. There are two major components of the machine. The first component may be termed a control component, and it maintains status indications for all the relevant global conditions in the system. It also contains indicators associated with each subsystem specifying the subset of global conditions required to activate the specific subsystem and indicators specifying the modification to the global conditions implied on completion of the subsystem. The second component is a computation component which executes the code associated with the data transformation aspect of each subsystem.

In operation, the control component first determines an eligible subsystem by examining the current status of the global conditions specified by each relevance indicator associated with each enabling predicate for the subsystem. The eligible subsystem is identified to the computation component which then executes the specified sequential arithmetic operations associated with the subsystem and returns status indications specifying the conditions that have been modified dynamically by the subsystem. The control component updates the global condition indications associated with having completed the subsystem. The cycle is then repeated until the system runs to completion.

Procedure Eligibility Determination

The eligibility of any particular subsystem, i can thus be determined by selecting the set of global unary predicates that are pertinent to initiating execution of the transformation $d' = \psi_i(d)$, and by determining the status of those pertinent unary predicates. Thus the control over transitioning can be implemented by:

(1) maintaining a variable system status vector S whose components are binary status indications, one for each unary predicate in the global set, and (2) maintaining for each subsystem, i a relevance vector, $R_i$ of fixed indications for designating which of the global set of unary predicates are relevant for enabling a particular subsystem.

Once the sense of the indications in $R_i$ and S have been defined, there exists a logical algebraic operation, ".", which can be defined such that $E_i = R_i \cdot S$, where $E_i$ is a binary status indication of the eligibility of the subsystem, i. The set of vectors, $R_i$ can be arranged as a matrix, R, the $i^{th}$ row of which is equivalent to $R_i$. The vector algebraic operation, ".", is then extended to include matrices such that:

$$E = R \cdot S, \text{ where}$$

Figure 4:
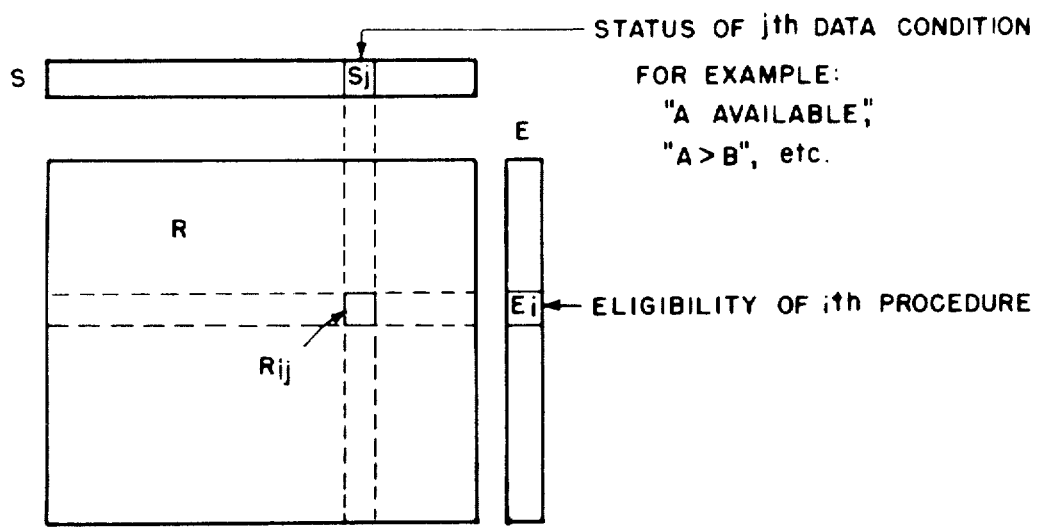
FIG. 4 is an illustration of the primary data constructs utilized for program eligibility determination by the system controller in accordance with the invention.

E is a vector indicating the eligibility status of every defined subsystem in the system. The relationship of the data constructs is shown in FIG. 4. A specific set of definitions and theorems relating the sense of the indications in R, S and E and the operations "." is included as Appendix A.

System Status Updating

There is now a prescription for determining subsystem eligibilities (E vector) based on system status (S vector) and the subsystems' conditional data requirements (R vector). There is now set forth a procedure for the computation of a new system status vector which is appropriate subsequent to the completion of a given subsystem.

There are several possible implications on the status of a data condition at the completion of a subsystem. They are as follows:

(1) The data condition remains unaffected by the subsystem running to completion;

(2) The data condition is satisfied whenever the subsystem runs to completion;

(3) The data condition is negated whenever the subsystem runs to completion; and (4) The data condition is determined dynamically by the execution of the subsystem.

It should be noted that there are also implied modifications to system status at entry to a subsystem in the preferred embodiments to be described; these modifications prohibit the same transition from being attempted in multiple processors by denying subsequent update access to d' when the transformation d'=$\psi_i$(d) is initiated.

The implications to system status at completion of a subsystem is readily accommodated by three data constructs. Two of these are fixed vectors (T and F) indicating respectively the always true (2 above) and always false (3 above) situations. For example, execution of a subsystem which is responsible for computing the value of a variable A would always result in the condition "A available" being set true. A third vector, V, is set dynamically (4 above) by the subsystem based upon the relationship of data variables computed by the subsystem. For example, the subsystems responsible for computing either of the variables A or >B would have to return the status of the condition "A B" upon completion. It is clear that the updated status vector S can be computed as a function of T, F and V. The class of functions can be restricted by overlapping the defined sense of the fixed vectors T and F so as to provide a mask against unauthorized dynamic changes to S through the V vector. Such an implementation is particularly desirable for preventing denial of service by a subsystem which may otherwise be used to intentionally modify a component $V_j$ to prohibit eligibility of another subsystem. The T and F vectors thus provide a means for insuring eligibility (and subsequent activation) of all subsystems needed to solve the problem. Appendix B provides a specific definition of the sense of T, F and V for a particular implementation. The logical expression compatible with the definitions of Appendix B for calculating a new system status vector $S_{NEW}$ upon completion of a subsystem (an exit transition) is given as follows:

$$S_{NEW}=(S_{OLD} \quad T_i) \quad (A_i \quad T_i) \quad (T_i \quad F_i)$$
$$(V \quad F_i)$$

A single vector construct, A is required to protect a procedure executing in one processor from being activated in another to perform the same data transformation in cases where this is inappropriate. A specific implementation of this construct is described in Appendix C.

GENERAL IMPLEMENTATION CONSIDERATIONS

To actually implement the approach described in the system overview, there are other issues which must be considered before detail design data becomes meaningful.

In relation to FIG. 3, it is apparent that the processor/system controller interface 12 must provide some synchronization mechanism to prevent multiple processors from simultaneously interacting with the system controller 10. In addition there must be provided a communication protocol between processor and system controller and the capability of specifying the type of transition (entry, exit or load) being requested by the individual processor. Provisions must also be made for external I/O and interrupt interfaces.

Ideally, the processors used in a general purpose transition machine would not be restricted to a single type. The latter considerations have been incorporated into a single coherent approach by including I/O controllers as processors of a specific type. Procedures are then designated as requiring a processor of a specific type (or type category). Then processors requesting eligible subsystems will only be provided with activities compatible with the type of requesting processor.

The designation of an assigned subsystem must be provided to the processor. This could be provided in various ways, but an index to the row in the matrices is all that is absolutely essential. Preferably, read, write and execute authorizations associated with an eligible subsystem are provided to the processor by the system controller rather than being obtained by indexed accesses by the processor to the main memory. This latter approach, however, is also possible.

The system status vector update requires a dynamically updated condition status vector (V) returned by the processor upon completion of subsystems. T and F could also be stored in the processor's main memory along with the access authorizations (execute, read and write pointers), but in the preferred implementation they are maintained in the system controller.

Figure 6:
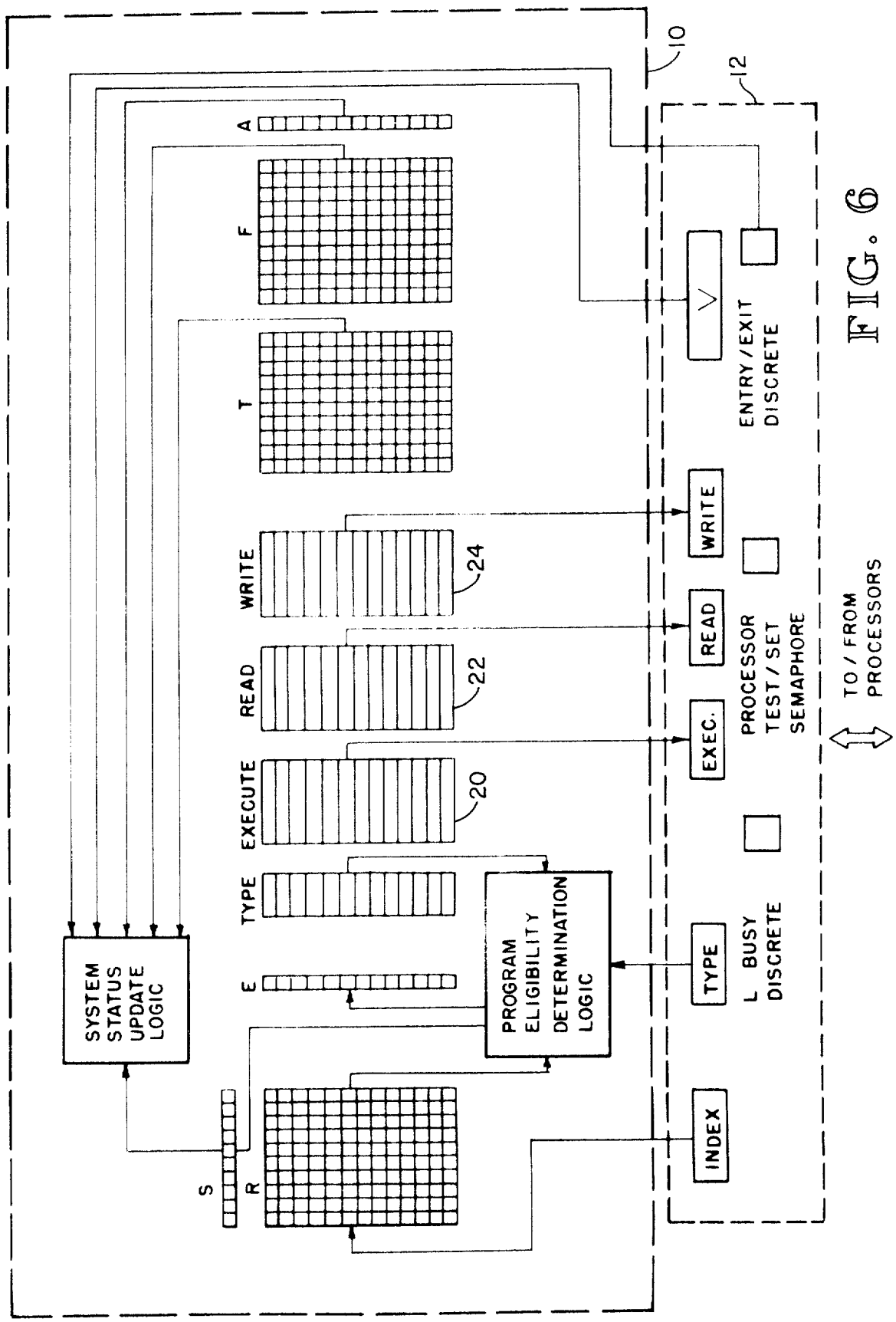
FIG. 6 is a block diagram illustrating the data constructs of the transition machine together with basic elements of the interface in accordance with the teachings of the invention.

FIG. 6 shows a block diagram of the preferred embodiment of the data constructs which address the implementation considerations described above and are maintained in the System Controller 10. The registers which comprise the processor/System Controller interface 12 are also shown. The processor/System Controller interface 12 contains all the data and control registers accessible by the processor. The structure and use of these registers are set forth in the following Table I.

TABLE I

| Descriptor | Definition |
|---|---|
| P/P | - a binary semaphore used to prevent multiple processors from accessing the processor/system controller interface registers simultaneously. The P/P semaphore is set (using a traditional test and set capability) when a processor is accessing the processor/system controller interface regisitors and it is cleared when no processor is currently accessing the interface registers. |
| L | - a binary status indicator used to prevent the processors from accessing the system controller interface registers while a system transition is in progess. When a processor initiates a system transition, it loads the appropriate data values in the X, INDEX, TYPE, and V registers (to be described) and sets the L discrete true. This requests execution of the System Controller which resets the L discrete false when the required transition is completed. |
| X | - a binary staus indication used to notify the System Controller of the type of system transition to effect. The X flag is set true by the processor when the system transition required is the result of a subsystem exciting, and X is set false by the processor for a subsystem entry transition. |
| TYPE | - a register used to contain the processor type identification. The System Controller uses this register to determine the next eligible subsystem whose identification is to be loaded into INDEX. TYPE is loaded by a processor with its processor category when it requests the next subsystem eligible for execution. The System Controller then returns the EXECUTE, READ, WRITE, and INDEX values associated with the next eligible subsystem, whose type is of the same category as the value contained in the TYPE register. (This con- |

TABLE I-continued

| Descriptor | Definition |
| --- | --- |
| | struct is required if a processor is to be able to request a specific type of subsystem,.) |
| INDEX | - a register used to contain the identification of either the next eligible subsystem or the subsystem currently being exited. At the completion of each system entry transition, the System Controller loads INDEX with the index of (the number of the row in the matrices associated with) the next eligible subsystem whose type is of the same category as the value contained in the TYPE register. INDEX is loaded by the System Controller with a special indicator if no subsystems for the current processor type are eligiblle. When a subsystem exits, INDEX contains the associated subsystem identification, i.e. the number of the row in the control matrices associated with the subsystem. |
| EXECUTE | - provides the entry point of the subsystem whose identification is in INDEX. This register is loaded only by the System Controller and is read by the processors. |
| V | - provides the variable update vector loaded by the processors upon completion of a system. This vector allows a subsystem to return variable data conditions to the system status vector. |
| READ | - provides the pointer(s) to the global data item(s) accessible to the associated subsystem in a read capacity. READ is loaded by the System Controller during an entry transition and is unused during an exit transition. |
| WRITE | - provides the pointer(s) to the global data items(s) accessible to the associated subsystem in a write capacity. WRITE is loaded by the System Controller during an entry transition and is unused during an exit transition. |

A plurality of EXECUTE, READ and WRITE registers 20, 22 and 24 respectively, are illustrated in FIG. 6. These registers correspond to the plurality of program subsystems under control by the system controller 10. The plurality of registers 20, 22 and 24 are the only access means provided for the program subsystems and may be termed EXECUTE, READ and WRITE access registers. A particular set of registers may be identified by reference to its associated program subsystem; thus register 20 (PGM1), refers to the single EXECUTE register of the plurality of registers 20 which is associated with subsystem PGM1. Similarly, 22(PGM1) and 24(PGM1) refer respectively to the particular READ and WRITE registers of the plurality of registers 22 and 24 associated with subsystem S1.

It should be noted that in the detail design of the multiprocessor embodiment described in the above cited copending application, an implementation is set forth wherein a multiport controller is used to prevent simultaneous access to the System Controller. In this case, the processors are not required to perform synchronization functions as these functions are performed by the multiport controller. The requirement of a binary semaphore is therefore removed from the processors in this detailed design.

It is further noted that the A vector shown in FIG. 6 can conveniently be replaced with an A matrix for the specific implementation defined in Appendix C.

System Controller Functional Operation-General Description

Figure 7:
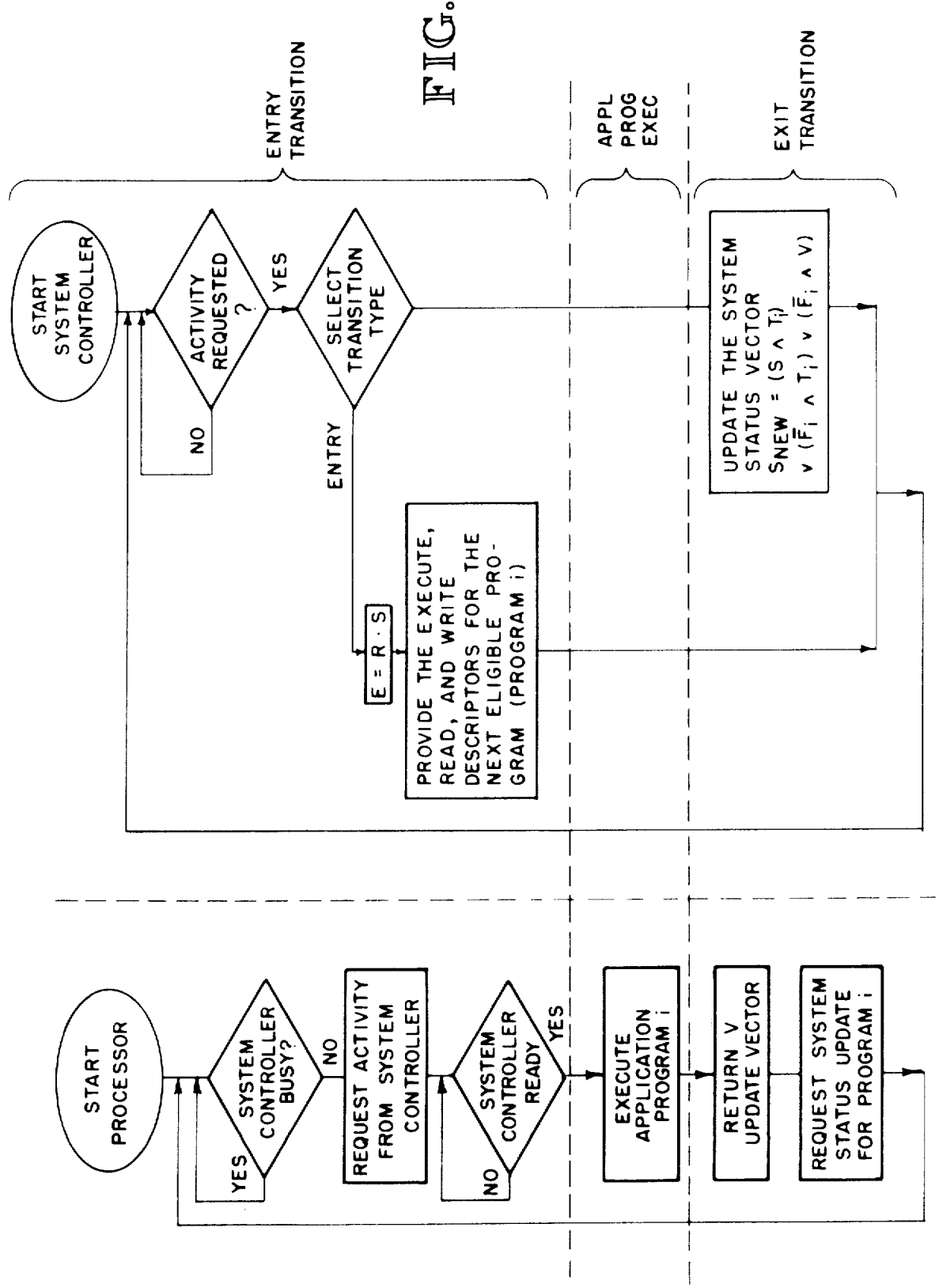
FIG. 7 shows a flow chart for the operation of a data processor and the system controller during various modes of operation of the transition machine.

A functional description of the interaction of the System Controller 10, the interface 12 and processors 2 is now set forth in reference to FIGS. 6 and 7. The processor capabilities are limited to:

(1) requesting the System Controller to provide a subsystem to be executed;
(2) executing the subsystem,
(3) updating variable data condition status indications for which the processor is authorized, and
(4) notifying the System Controller that the subsystem has been completed.

Furthermore, all inter-subsystem communication is controlled by the System Controller.

When a processor is in an idle state requesting an activity, it performs a test-and-set operation on the P/P semaphore. This semaphore is used to synchronize the processors so that only one processor is accessing the system controller registers contemporaneously. After gaining access to the System Controller it waits until the logic segment of the System Controller is not busy. At that time it stores its processor type identification into the register, TYPE. The register X is set false to indicate a subsystem entry is being requested. The L discrete is set true to signal the System Controller logic to initiate a transition. The processor will then wait until the System Controller logic has completed its operation (indicated by the L discrete being reset).

When the System Controller detects that a transition is to be initiated (by the L discrete having been set true), it will determine whether the entry or exit transition has been specified. If the entry transition is specified (indicated by X=false), the matrix logical dot product is performed to obtain the next eligible subsystem of a type compatible with the processor TYPE register. If such an eligible subsystem is determined, its index is stored in the INDEX register, the subsystem access pointer is stored in the register EXECUTE, and the data access pointers are stored in READ and WRITE registers. The active protection specification for the subsystem (the A vector) is used to update the system status vector to preclude inappropriate simultaneous execution of the same subsystem by another processor. (If no eligible subsystem exists for the processor, this will be indicated by returning a null INDEX register.) Then access authorization is returned to the processor by resetting the L discrete false.

When the processor detects that transition authorization has been given (by L discrete being reset false and INDEX register containing a non-null value), the following sequence is performed: the INDEX register value is saved, the READ and WRITE registers are obtained to set up the data access linkages, and the EXECUTE register is obtained to set up control linkages. The P/P semaphore is reset to allow other processors access to the System Controller interface registers. Control is passed to the specified subsystem. The subsystem may, in addition to whatever data processing activities are appropriate to it, modify a V register in the processor.

When a subsystem exits, the processor performs a test-and-set operation on the P/P semaphore. After gaining access to the System Controller it waits until the logic segment of the System Controller is not busy.

At that time the exiting subsystem's identification is loaded into the INDEX register, the processor copies its own V register into the V register of the System Controller interface, and sets the register X true to indicate a subsystem is being exited. The processor will then activate the System Controller logic by setting the L discrete register true, set itself into an entry request mode, and finally reset the P/P semaphore to allow other processors access to the system controller interface registers.

When the System Controller detects that a transition is to be initiated (by the L register having been set true), it determines whether the entry or exit transition has been specified. If the exit transition is specified, the value in the INDEX register is used to index into the data constructs, providing the A, T and F values to incorporate the change in the system status vector caused by the exited subsystem. The V register is also accessed to perform this update. When the status update is complete the System Controller indicates its readiness to honor further requests by resetting the L discrete false.

It is to be noted that the TYPE register may be used to identify the various types of processors requesting access to the System Controller so that a subsystem i will not be eligible for execution by the requesting processor unless the processor is of the proper type for carrying out the $i^{th}$ subsystem. In this manner special processors can be incorporated which are endowed with unique capabilities e.g., floating point processors, vector instruction set processors, byte or word oriented processors I/O processors, or specific model processors as desired.

Access Matrix Implementation-General Description

Figure 8:
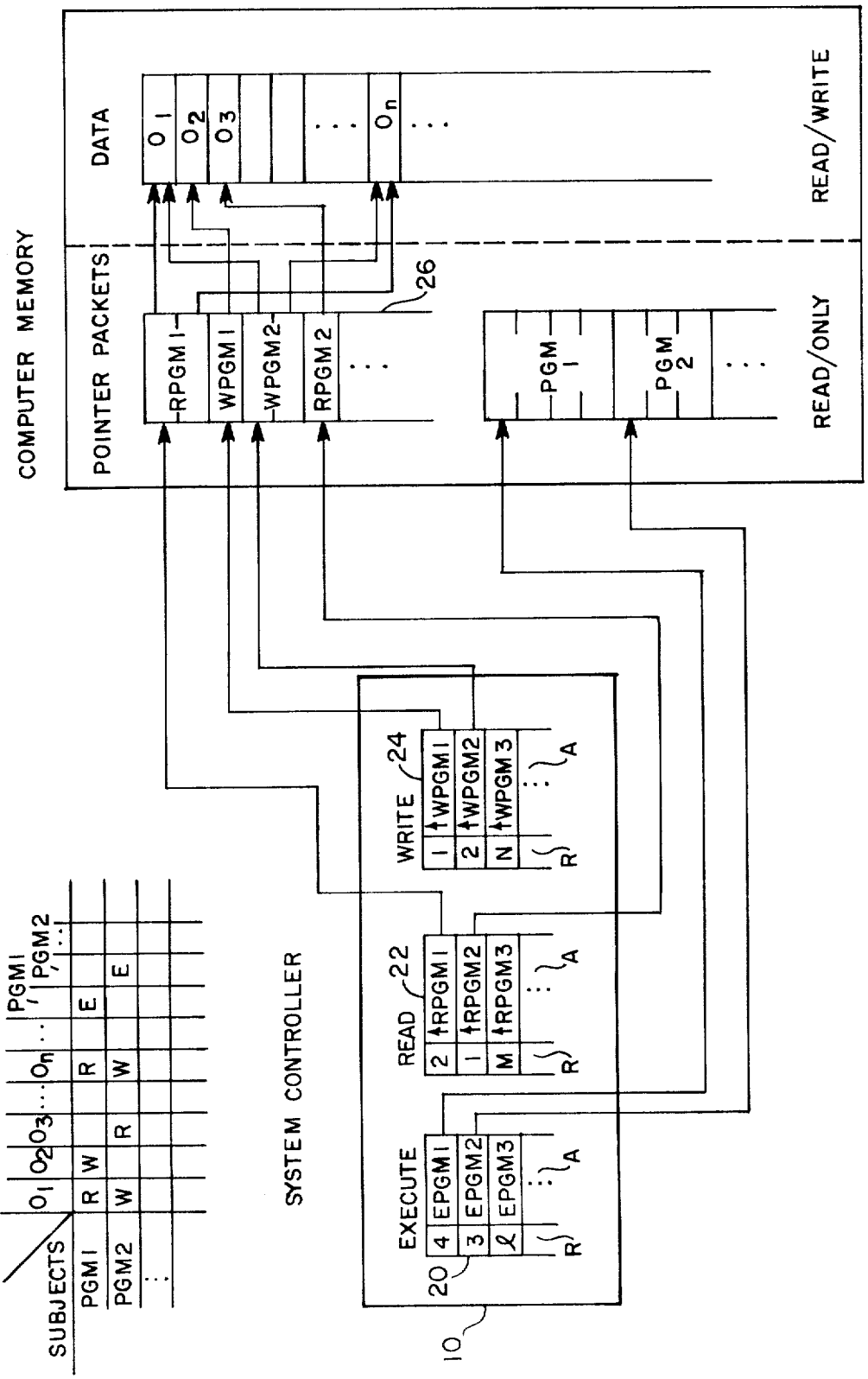
FIG. 8 is a schematic diagram showing the relationship between the access matrix, system controller registers and computer memory.
Figure 9:
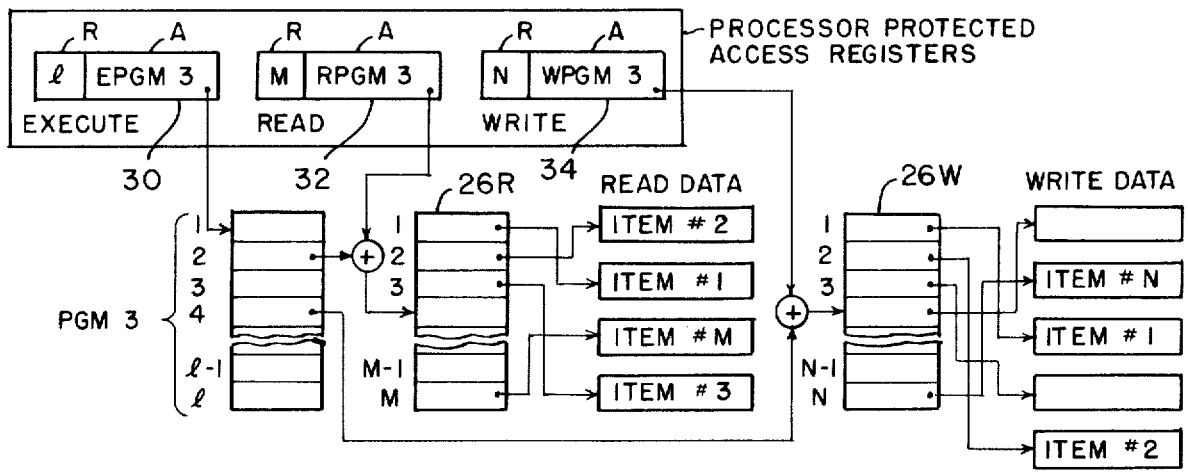
FIG. 9 illustrates the more detailed indirect addressing scheme of FIG. 8.

The straighforward implementation of a secure application system in a transition machine is shown diagrammatically in FIGS. 8 and 9. An access matrix is constructed which specifies the access authorizations appropriate to each of the subsystems in the application program system. This access matrix is verified for compliance with security requirements and is used as the basis for the identification of trusted subsystems as described above. Once these activities have been completed, the individual rows in the access matrix are implemented in corresponding rows in the system controller of the transition machine. For example, the first row shown in FIG. 8 indicates that subject PGM1 must have EXECUTE access to the program subsystem PGM1. It is assumed, for example, that the subsystem PGM1 requires four (4) words of computer memory access beginning at address EPGM1. The execute pointers EPGM1, EPGM2, EPGM3 etc. stored in the system controller EXECUTE registers 20 thus supply the starting addresses for program subsystems PGM1, PGM2, PGM3 etc. A field (one or more bits) of each execute register specifies the range limitation of the corresponding program subsystem. The range specifying field of these registers is identified by R whereas the access address field is identified by A. Subsystem PGM2 begins at address EPGM2 and has a length of three (3) words. Subsystem PGM3 begins at address EPGM3 and requires 1 words of memory. The program subsystems correspond to the application programs and may be stored in the read only memory. Each program is stored in contiguous memory storage locations accessible by the processor.

To access program memory, the processor provides a displacement which is added to the address field, A, of the EXECUTE register 20 to obtain the absolute starting address of the program instruction words. This displacement is initialized to zero when the program is activated to obtain the first instruction for placement in the processor's instruction register. The displacement (similar to an index value) is incremented to obtain each successive program instruction. When the displacement is equal to the range field, R, specified in the EXECUTE register 20, the subsystem has completed execution and the appropriate exit transition is initiated. The processor microcode may be utilized to ensure that no instruction word displacements are generated which are outside of the range field specified.

The access matrix indicates subject PGM1 requires read access to data items (objects) $O_1$ and $O_n$. The READ access register in the system controller which corresponds to the subsystem PGM1 is thus set up with a limiting range of two read accesses. The processor memory access computation logic is preferably restricted to support only a single addressing mode. This addressing mode is indirect through intermediate descriptor words represented by pointers 26 as implied by FIG. 8 and shown specifically in FIG. 9.

Subject PGM1 requires a single write access to object $O_2$, and thus has a write range limitation of one. Similarly, the range limitation and address may be specified for the program subsystems PGM2 and PGM3 by examination of the access matrix of FIG. 8.

The read and write access limitations may be specified by designated range fields of the READ and WRITE registers 22 and 24 respectively, similar to the case of the EXECUTE registers 20.

In FIG. 8 the use of read-only memory for descriptor as well as program storage is indicated. ROM storage is not necessary, however, and for large dynamic systems, trusted buffer management subsystems can be developed to modify these access descriptor words dynamically just as they can be for conventional systems, with the added advantages of a simplified verification/certification procedure required by such subsystems because they would also be written as sequential programs activated by the System Controller.

It is noted that FIG. 8 is a simplified diagram of the access implementation whereas FIG. 9 is a more detailed diagram for the particular subsystem PGM3, loaded into protected registers of a processor.

FIG. 9 illustrates the detailed indirect addressing mode of operation of the processor 2. The processor 2 has an execute register 30, read register 32 and a write register 34 which are loaded by the system controller 10 either directly or through the interface 12 (applicable, for example, for multiprocessors). These registers are protected in the sense that they cannot be modified by the processor. These registers, similar to their counterparts in the system controller, have a range field R and an address field A. Register 30 is shown loaded with the starting address of program PGM3 which occupies 1 contiguous storage locations of memory. In accordance with the principles of the invention, these storage locations are contiguous and most preferably the processor instruction repertoire is limited for execution of go-to-less instructions, i.e., sequential program code having no branch capability.

Read register 32 is loaded with the starting address RPGM3 of a group of read pointers 26R whereas write register 34 is loaded with address WPGM3 defining the top of a group of write pointers 26W. The group of read pointers 26R form a read pointer packet of M contiguous storage locations, and similarly, write pointers 26W form a packet of N contiguous pointers. The range field R for the read and write packets serve as limit values which restrict the number of data items that can be accessed by the processor when executing the particular data transformation. Program PGM3, for example, is shown to have a read displacement defined by the second program instruction. This displacement is added to the address field RPGM3 to obtain the specific read data pointer for the desired data item. The program microcode is employed to ensure that no read or write access is permitted beyond that specified in the range field, for example, the value M.

Read pointers 26R and write pointers 26W are stored in contiguous memory storage locations. This intermediate addressing approach permits the actual data items to be stored in noncontiguous memory storage locations, which is a feature particularly attractive in shared data systems. Contiguous storage of the pointers, however, is not restrictive but is rather desirable from the security viewpoint. A unique group of read and write pointers, or pointer packets, is thus provided for each subsystem PGM1, PGM2 . . .

Figure 10:
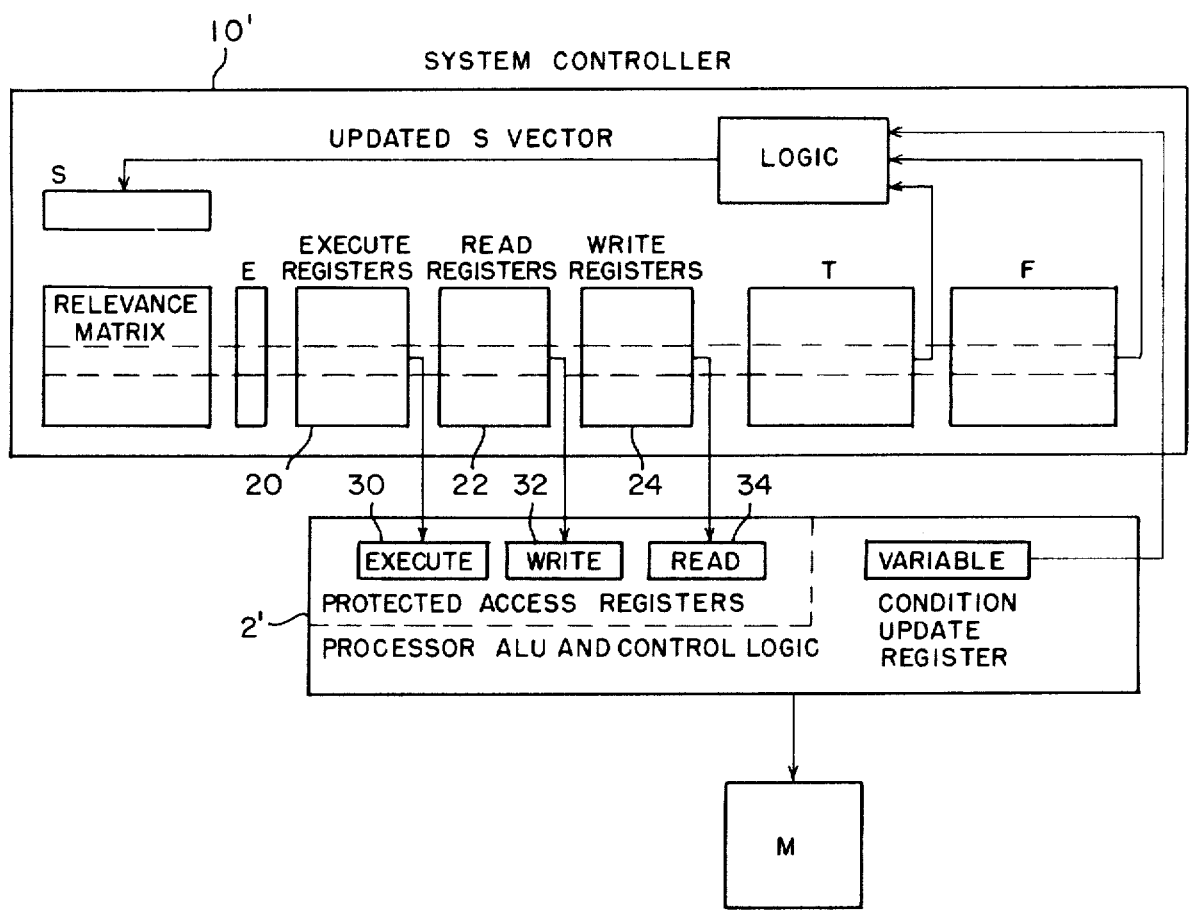
FIG. 10 is a block diagram of a uniprocessor implementation of the invention showing the protected access registers therein.

FIG. 10 illustates the basic components of the system controller 10' and a single processor 2'. The execute register 30, write register 32 and read register 34 are protected registers within the processor. Branch and direct memory access instructions of the processor are preferably eliminated from the processor instruction set.

It is noted that while sequential, GO-TO-LESS code is preferable, the execution access may be restricted to a contiguous domain of memory with branching permissible only within the contiguous domain. Sequentially executed code is not required. A single exit point in the program would then be utilized to set a program complete discrete indicator for the system controller and also halt the processor operation.

Figure 11:
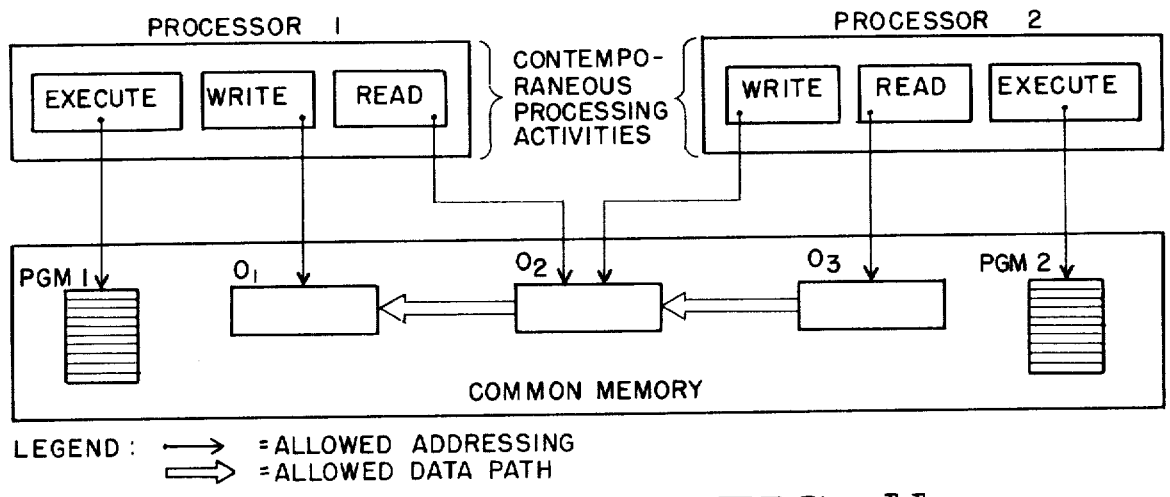
FIG. 11 illustrates a security impacting race condition which may occur in multiprocessors.

The description set forth above is applicable for both uniprocessor and multiprocessor implementations of transition machines. On multiprocessor implementations, however, there is an added logical requirement which arises from a race condition which may exist between two processors accessing a given memory location (object). The problem is illustrated in FIG. 11, wherein processors 1 and 2 are concurrently executing subsystems PGM1 and PGM2, respectively. Subsystem PGM2 has write access to object $O_2$, and subsystem PGM1 has read access to object $O_2$. Generally, when either subsystem has a write access to the common object, a race condition exists which can be eliminated by simply recognizing that such program parallelism is invalid at the outset. This type of invalidity can be determined by a static analysis of the system controller constructs and the associated data descriptors.

Example Program

An example program is now set forth to describe how the software actually operates on a transition machine and a specific implementation of the S, E, R, T, F, A and V constructs (as described above and in Appendices A, B and C).

Figure 12:
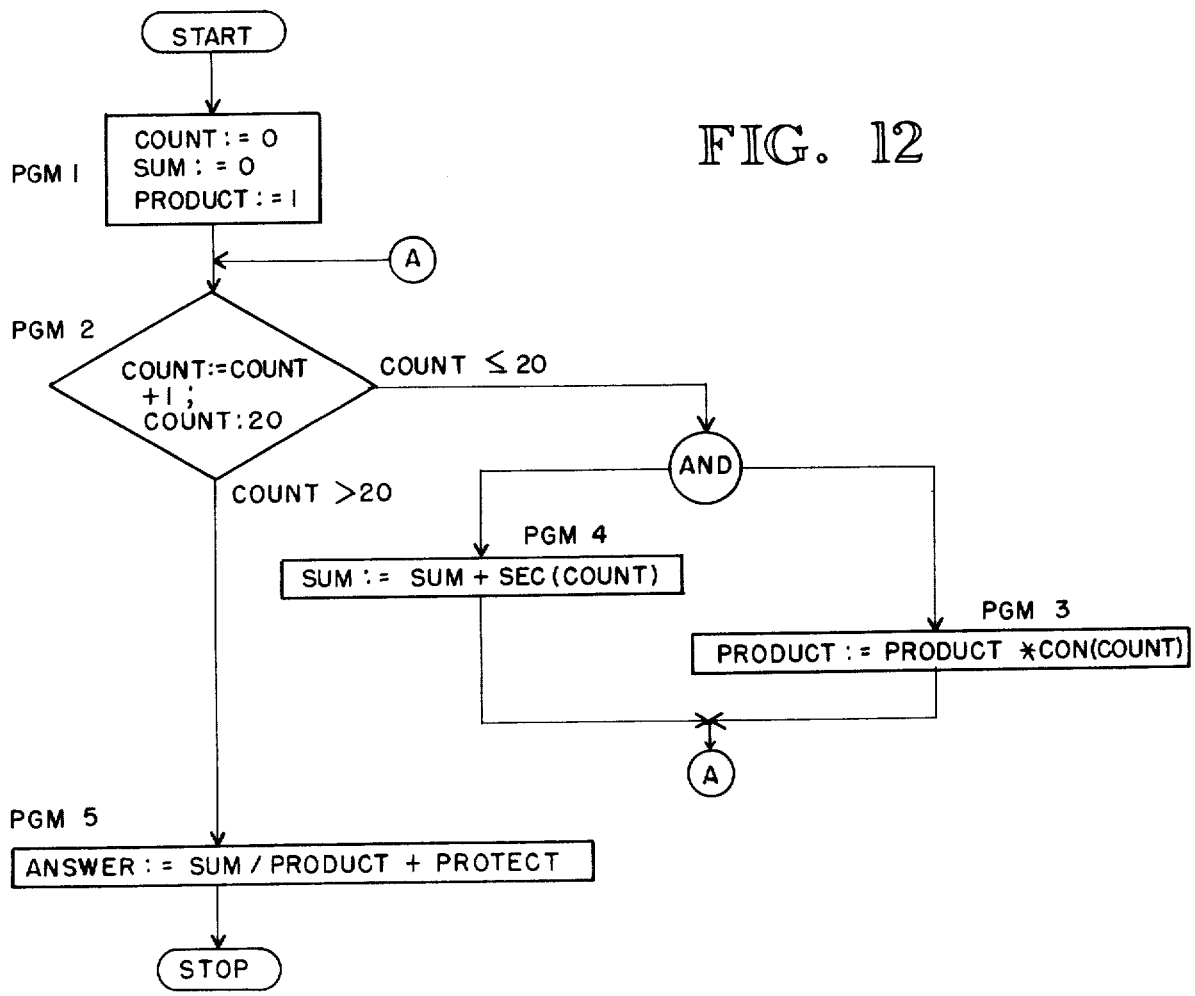
FIG. 12 is a flow chart of an example program utilized to illustrate the invention.

FIG. 12 is a flow diagram of the example program to be used. For each block on this diagram, a high order language procedure is written to perform the function. Such a simple computation might not typically be broken into so many small subsystems, but this has been done primarily to give a clear example of how one can implement control flow with the unique computation structure. Additionally, the small program scope has advantages in multilevel secure systems. The function performed by the example set of programs simply computes the sum of the elements in the twenty word array SEC divided by the product of the elements in the twenty word array CON with an encryption code added. This function is not essential to the treatment and is given only to illustrate later how "trustedness" requirements propogate through the system, and how to proceed in the certification of secure systems. It is important to note the parallelism that is exploitable in this computation in that the product (PGM 3) can be computed in parallel with the sum (PGM 4). This produces no security-related problems in multiple processor systems as long as it can be shown that data race conditions and surreptitious data paths as shown in FIG. 11 do not exist.

The programming structure utilized for the source statements for this example program is shown in FIG. 13. In this structure each subsystem is divided into two components: (1) a complete specification of the global conditions required to enable the subsystem (WHEN (list of conditions)), and a specification of the global conditions updated on completion of the subsystem (THEN (list of conditions)), and (2) a sequential set of data transformation statements. FIG. 14 shows the complete dichotomy of control and data transformations for this program.

Example Program Execution

Figure 15:
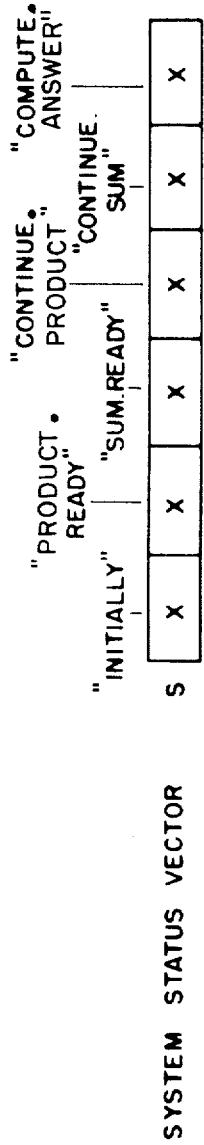
FIG. 15 is an illustration of the R, T, F and A matrixes and the S vector corresponding to solving the example problem in accordance with the invention.

FIG. 15 illustrates appropriate value assignments for the defined constructs in the system controller for the example program of FIG. 13. The assignments of subsystems and unary predicates to rows and columns of the constructs appropriate to the example are as follows:

A. The components of the system status vector, S, defined in Appendix A, are binary status indications of the unary predicates which have been represented by name in the example program listing of FIGS. 12–14. Thus, for the example program, the assignment of unary predicates to components of S can be made as follows: $S_1$, "Initially"; $S_2$, "Product.Ready"; $S_3$, "Sum.Ready"; $S_4$, "Continue.Product"; $S_5$, "Continue.Sum"; and $S_6$, "Compute.Answer".

B. The relevance matrix, R, is defined in Appendix A. Each row in the R matrix is assigned to a subsystem. The assignments for the example program are as follows: Row 1, PGM1; Row 2, PGM2; Row 3, PGM3; Row 4, PGM4; and Row 5, PGM5. Each column in the matrix is associated with a unary predicate with assignments corresponding to those for S.

C. The T and F matrices are defined in Appendix B. Each row of these matrices is associated with a subsystem with assignments corresponding to those of R. Similarly, the columns are assigned to unary predicates just as they are for R.

D. The V vector is defined in Appendix B. The binary status indicator components of V are assigned to correspond to those of S.

E. The A matrix is defined in Appendix C. The row and column assignments correspond to those of R. For the example, the values used for A correspond to $\overline{R}$ which is not necessary but sufficient to provide the needed protection for a multiple processor implementation.

FIG. 16 is a flow diagram that shows the states of the various constructs during execution of the example program. The operations causing the various state transitions are identified above the transition arrows. Each initial state is identified by a number.

The initial S vector for the example program is S=(1,0,0,0,0,0), indicating "Initially" is the only data condition currently true. By generating the dot product of the R matrix shown in FIG. 15 with the current S vector (as described in Appendix A), it is seen that only $E_1$ is non-zero at this time so that the only eligible subsystem is PGM1. An entry transition is initiated for PGM1 which is dispatched to a processor. This entry transition causes an update to the S vector (involving the A vector) which makes PGM1 no longer eligible after entry and thereby precludes the inappropriate simultaneous execution of PGM1 in more than one processor. The system remains in this state (state 2) until PGM1 executes to completion and the appropriate exit transition is initiated at which time the system transitions to state 3. In state 3, only PGM2 is eligible. PGM2 is dispatched to the next processor requesting an activity. The appropriate entry transition is performed when PGM2 is dispatched, which puts the system in state 4 where again no subsystems are eligible. The system remains in state 4 until PGM2 is complete, at which time the exit transition for PGM2 is initiated. On completion of the PGM2 exit transition the system will be in either state 5 or state 10. There are two states possible because of the variable (data value dependent) update returned by PGM2 as shown in FIG. 13. If the system is in state 5 then both PGM3 and PGM4 become eligible simultaneously. These two subsystems can be executed in parallel by separate processors. The state flow diagram in FIG. 16 shows PGM3 being dispatched to a processor and the system transitioning to state 6. PGM4, which is still eligible in state 6 is then dispatched to another processor and an entry transition to PGM4 is performed which puts the system in state 7. (The order in which these two subsystems are dispatched could be interchanged and the end effect would remain the same.) The system will remain in state 7 until either PGM3 or PGM4 runs to completion and the appropriate exit transition is performed. The order in which these subsystems complete is also unimportant, in that the end result will be the same in either case. The state flow diagram in FIG. 16 shows PGM3 completing first which causes the system to transition from state 7 to state 8 and then PGM4 completes which causes the system to transition from state 8 to state 9. In state 9, PGM2 becomes eligible again and the sequence is repeated. If on completion of PGM2 the system is in state 10, PGM5 becomes eligible. When PGM5 is dispatched the entry transition will put the system into state 11 and the system will remain in this state until PGM5 is completed. On completion of PGM5 the system will transition to state 12 which represents the end of the example program. No more transitions will take place until another set of constructs is loaded into the system controller.

Access Matrix Implementation-Example Program

The example program of FIG. 13 may now be utilized to illustrate the multilevel security features of the invention. Three different data classifications are assumed: secret, confidential and unclassified. FIG. 17 and Table II below illustrate the classification assignments of data and objects.

TABLE II

| Object | Classification |
|---|---|
| COUNT | Unclassified |

TABLE II-continued

| Object | Classification |
|---|---|
| SUM | Secret |
| PRODUCT | Confidential |
| ANSWER | Confidential |
| PROTECT | Secret |
| SEC(array) | Secret |
| CON(array) | Confidential |

SEC and CON are arrays from which to compute the sum (secret) and product (confidential) values. It is assumed that the ultimate receiver of ANSWER does not have access to the sequence of individual values in the SEC and CON arrays. An encryption constant PROTECT (secret classification) is added to the ratio computed by subsystem PGM5 to prevent calculation of secret data, SUM, from data of a purely confidential nature, namely, ANSWER and PRODUCT. The justification for the classification scheme utilized corresponds to a data array wherein, for example, individual ages of members of a group could be maintained secret (corresponding to the SEC data array) but the average value of the group could have a lower classification, i.e., confidential (corresponding to ANSWER).

The individual program subsystems PGM1, PGM2, . . . PGM5 required to implement the computational requirement do not exist a priori and, therefore, authorization assignments (to the extent that they are meaningful) must be made following program design. The resulting access matrix is shown in FIG. 18, where program authorizations are based on access requirements to classified data. In transition machine implementations as described herein, authorization is used only in pre-execution verification analysis, since the elimination of the request basis for access permission eliminates the need to check authorization dynamically.

Trust Identification

A procedure is now set forth to permit a determination of which programs (and what aspect of these programs) to certify as warranting trust. The procedure may be set forth in reference to a general access matrix such as shown in FIG. 2. On a first pass through the access matrix, each row of the access matrix is inspected to see which programs, if any, violate the *-property. These programs must be "write-trusted" not to downgrade or mix data inappropriately. Once these programs have been identified (it is assumed that they will ultimately be certified to warrant this trust), the data items must be identified which are inputs to these programs and might contain coded information that could then be downgraded (mixed) without the trusted program being able to avoid it. (This sabotage activity is sometimes called "spoofing".) The columns (objects) associated with these data items are then identified as being "read-trusted". When the read-trusted and write-trusted relationships have been identified for all rows in the matrix, another pass is made through the matrix to identify which programs write previously identified read-trusted data. These programs are then identified as write-trusted for the specific data requiring trust. The entire process is then repeated until a pass is made through this access matrix with no further read-trust being identified. At this point, the trust identification process is completed.

The guarantee of trustworthiness is obtained by proving that the transformation of data between read-trusted inputs and outputs for which the program is write-trusted are performed correctly from a security standpoint. This procedure does not require proof that every aspect of the trusted program is correct, but only the verification of the data/control stream between the trusted input and output, and verification that control cannot be transferred to the middle of this path. Such proofs are typically very difficult to obtain since both hardware and software reliability are involved. For conventional computer designs it must be proven that there is no way that a branch can be made to the middle of the sequence which writes the data. In the transition machine utilizing non-branching sequential code the verification procedure is much simpler.

The general trust determination procedure set forth above may now be illustrated in reference to FIG. 19. On the first pass through the access matrix, it may be seen that PGM5 reads data (SUM and PROTECT) at a higher classification than the data (ANSWER) that is written. Thus PGM5 does not satisfy the *-property and must be certified to warrant the trust that SUM and/or PROTECT will not be compromised. But, merely verifying PGM5 cannot guarantee that a compromise will not result. A program which writes SUM could "Spoof" PGM5 by writing the value (SUM-PROTECT)* PRODUCT into SUM, in which case PGM5 would inadvertently compute:

ANSWER: =(SUM-PROTECT)*
PRODUCT/(PRODUCT) + PROTECT = SUM and establish a security-violating breach of the system. The "spoofing" program would not require a violation of the *-property.

Subsequent passes must therefore be made through the access matrix to trace the lines of trust so that programs which are required to violate the *-property cannot be spoofed.

In the example, SUM, PRODUCT and PROTECT are identified as "read-trusted" objects. All programs which have write access to these objects must be identified as "write-trusted". PGM1, PGM3 and PGM4 are thereby identified as requiring "write-trustedness", but before they can be certified, it must be shown that they in turn cannot be spoofed. PGM4 requires that COUNT be manipulated properly, since otherwise single values of SEC and CON could be included in SUM and PRODUCT, and the secret values SEC (COUNT) could be obtained by a program authorized only for confidential data having access to COUNT and the array CON. Thus, for example, COUNT may be set at 19 and SUM initialized to CON(20)*(SEC(20)-PROTECT)-SEC(20), which could be done in PGM1 for example, without violating the *-property. Under these circumstances PGM5 may be utilized to derive ANSWER: =SEC(20) revealing a specific value of the secret data SEC(20).

Since COUNT must be read-trusted, all programs which have write access to COUNT must be identified as write-trusted, i.e., PGM1 and PGM2. The procedure may be repeated with the result appearing in FIG. 19. It may be seen that even in the rather simple program utilized, every subject must be write-trusted with respect to selected objects. Moreover, these trust requirements have been derived by assuming that no branching or other control transfer statements are permitted in the instruction set. It may well be appreciated that for complex programs with numerous branching chains, program verification becomes a monumental task.

Construct Assignments

The System Controller constructs for the example program are shown in FIG. 20. This figure is similar to that of FIG. 8 provided for the general case. The protected processor registers are not shown for clarity of illustration. The first row of these constructs are associated with PGM1, the second with PGM2, and so on. Each program has execute access via EXECUTE registers 20 to the sequential block of machine code associated with the specific data transformation, read access to data items specified by the READ register 22 and write access to data items specified by the WRITE register 24. For example, PGM1 has read access to no data items and write access to COUNT, SUM, and PRODUCT. PGM2 has read and write access to COUNT. PGM3 has read access to COUNT, PRODUCT, and the 20 word CON array and write access to PRODUCT. PGM4 has read access to COUNT, SUM and the 20 word SEC array and write access to SUM. PGM5 has read access to SUM, PRODUCT, and PROTECT and write access to ANSWER. These access capabilities correspond to those specified in the access requirements matrix of FIG. 18.

In accordance with another aspect of the invention, the read pointers 26R have a base field 40 and range field 42 as shown in FIG. 20. The base field 40 of pointer CON, for example, gives the first address of the data array CON whereas the range field 42 specifies the number (20, for example) of addresses which form the array. The array access method is extended to write pointers 26W which have base fields 50 and range fields 52 as shown in FIG. 20. In the example of FIG. 20, write authorizations all have a range of one.

Example Secure Program Certification Procedure

Certification is a requirement on every trusted subject. It must follow a detailed verification that the trusted aspects of the associated program performs precisely the correct function. For sequential programs supported by the transition machine architecture, this verification process is greatly simplified. Once the sequence is shown to implement the desired transformation in transition machines, there is no further requirement to verify that control cannot be passed to an unspecified interior location in this sequence and thereby finish the sequence with a different result.

Justification of Trust

The trust identification procedure indicates the aspects of each program whose integrity must be verified. Trust verification proceeds from programs which violate the *-property, following all lines of trust to support this basic requirement.

In the example program one begins with PGM5, verifying that the function ANSWER: =SUM/PRODUCT+PROTECT is performed correctly. An inspection of the sequential machine code reveals (depending upon the specifics of the processor) a sequence of instructions as shown on the left hand side of Table III below.

TABLE III

| LD  | *(READ)     |               | LD  | SUM     |
|-----|-------------|---------------|-----|---------|
| DIV | *(READ + 1) | $\Rightarrow$ | DIV | PRODUCT |
| ADD | *(READ + 2) |               | ADD | PROTECT |
| ST  | *(WRITE)    |               | ST  | ANSWER  |

The use of parentheses preceded by an asterisk indicates indirect addressing. The processor preferably is only capable of indirect addressing so that this specification could be implicit. One must verify that the first object which can be read, *(READ), is in fact SUM, etc., so that the implication to named objects as shown in justified. This is done by determining that the READ register 22 associated with PGM5 in FIG. 20 contains a value which is the address of a pointer whose value indicates the location assigned to the variable SUM, etc. Then it must be shown that the four-instruction sequence of Table III implements the higher level program statement shown for PGM5 in FIGS. 12 and 13.

Next, PGM4 must be verified in its capacity as a generator of the "read trusted" object SUM. The requirement of this computation is:

$$SUM = \sum_{i=1}^{20} SEC_i.$$

The associative law of addition is assumed in the implementation.

$$SUM_i = (((((SEC_1) + SEC_2) + SEC_3) + \ldots) + SEC_{i-1}) + SEC_i$$

$$SUM_i = SUM_{i-1} + SEC_i$$

The mathematical induction required to substantiate the final expression is dependent upon (1) the proper sequencing of the index, i, implemented as COUNT, and (2) the initial value $SUM_0$. Therefore, PGM4 must be verified to correctly implement the assignment statement $SUM_i:SUM_{i-1}+SEC_i$, and PGM2 and PGM1 respectively must be verified as correctly sequencing the subscripts and correctly initializing SUM. The verification of the single step computation is performed as described in the description of verification for PGM5, above.

The verification of PGM2 involves the proof that COUNT effectively sequences through all PGM4 computation steps i=1 to i=20. This involves verifying that the sequential code associated with COUNT: =COUNT+1 is correct. The computation of the condition CONTINUE.SUM: =COUNT≦20 must also be demonstrated as being correct to justify the termination condition for the computation of SUM. In order to verify these two assignment statements, COUNT must be initialized properly, but that responsibility is part of the trust requirement on PGM1.

The verification of PGM1 requires proof that SUM and COUNT are initialized to zero properly, which is verifiable by direct inspection of the sequential code, etc.

Processor Firmware Verification

It is assumed that the individual instructions whose operation codes are verified by the preceding procedures work correctly. This assumption is only justifiable following a detailed verification of the microcode which implements these macrolevel instructions. This firmware verification procedure is performed in a manner very much like that described for software. However, such verification only needs to be performed once for the processor if sufficient physical security controls are maintained over the processor once it has been verified.

Hardware Verification

The individual circuits which comprise the lowest design level of the processor and system controller must also be verified as performing precisely (and only) their specified functions. Finally, electromagnetic emanations from the vicinity of the processor must be shown to exclude the possibility of transmitting compromising information. Shielding and other design techniques are used to ensure against such surreptitious data paths.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

APPENDIX A

In the implementation of the model of parallel computation, specific definitions are assigned to the set of constructs R, S and E and the matrix algebraic operation, "." on these constructs which effect a transition system.

Definition A.1. The system status vector, S is a set of binary status indications on the data set d such that for every data condition there is an associated status indications, $S_j$ in S if and only if $S_j$ is relevant to enabling some procedure in the system. $S_j=1$ if the associated data condition is met, $S_j=0$ otherwise.

Definition A.2. The system eligibility vector, E is a set of binary status indications on the set of unary predicates, $R_i$, indicating whether $R_i$ is currently satisfied, enabling the associated procedure. $E_i=1$ indicates the associated unary predicates are satisfied; $E_i=0$ otherwise.

Definition A.3. A system status condition, $S_j$ is relevant to enabling procedure i if and only if the data condition whose status is indicated by $S_j$ is included in the unary predicates, $R_i$.

Proposition A.1. The unary predicates, $R_i$ can be represented as a set of binary relevance indications associated (and in conjunction) with each of the conditions whose status is maintained in S. This proposition follows directly from the previous definitions.

Definition A.4. The relevance matrix, R is comprised of binary relevance indications, $r_{ij}$ indicating the relevance of system status condition j to enabling procedure i. Relevance is indicated by $r_{ij}=0$, irrelevance by $r_{ij}=1$.

Definition A.5. The logical dot product, P of a matrix M times a vector, V with compatible dimensions is defined as the vector, $P=M\cdot V$, where $$P_i = \bigwedge_{j=1}^{J} m_{ij} \vee V_j.$$

Proposition A.2. The system eligibility vector, E can be computed appropriate to a given state of the system by taking the logical dot product of the relevance matrix R and the system status vector, S.

Proof: From Definition A.5 it follows that:

$$[R \cdot S]_i = \bigwedge_{j=1}^{J} (r_{ij} \vee s_j).$$

From Definitions A.4 and A.1 it follows that $r_{ij} \vee s_j = 1$ if and only if the condition j is either met or irrelevant to enabling procedure i. Then by proposition A.1 is follows that $[R \cdot S]_i = 1$ if and only if all conditions of the unary predicates $R_i$ are satisfied. Thus, $[R \cdot S]_i = E_i$ by Definition A.2, and it is proved that $E = R \cdot S$ as proposed.

APPENDIX B

Specific definitions are assigned to the constructs T, F, V and their functional relationship. The definitions which follow are used to restrict access of application programs.

Definition B.1. The $j^{th}$ element, $t_{ij}$ of the true condition vector, $T_i$ is a binary status indication associated with the procedure i and the system status condition, j such that $t_{ij} = 1$ implies condition j is either satisfied or unchanged by the completion of procedure i.

Definition B.2. The $j^{th}$ element, $f_{ij}$ of the false condition vector, $F_i$ is a binary status indication associated with the procedure i and the system status condition, j. The element $f_{ij} = 1$ implies the condition j is either not satisfied or unchanged by the completion of procedure i.

Definition B.3. The variable condition update vector, V is a set of binary status indications which can be set dynamically by the procedure running in a sequential processor. The component $V_j$ is set to 1 by the procedure to indicate that system status condition j is satisfied or $V_j$ is set to 0 to indicate condition j is not satisfied.

Proposition B.1. The four possible implications on change in system following completion of procedure i can be computed according to the formula:

$$S = (S \land T_i) \lor (\overline{F_i} \land T_i) \lor (T_i \land \overline{T_i})$$

where the bar indicates the logical NOT operation.

Proof: The proof follows directly from the definitions of the associated vectors as shown in the Truth Table B.1 given below.

It should be noted that there are many forms which proposition B.1 could take. The expression used has the advantage of restricting the range of $V_j$ such that procedure i can only modify conditions for which it is authorized.

Proposition B.2. The range of V is restricted such that V modifies only a specified subset of the system status conditions, j. This subset is determined by $T_i$ and $F_i$ for procedure i such that $S_j$ is determined by $V_j$ if and only if $t_{ij} = 0$.

Proof: The implied new values of $S_j$ for the various values of $t_{ij}$ and $f_{ij}$ from proposition B.1 are shown in Table B.2 taken from Table B.1 from which the proposition follows directly.

TABLE B.1

| SYSTEM STATUS CONDITION TRANSITION TRUTH TABLE | | | | | |
|---|---|---|---|---|---|
| $S_{jOLD}$ | $f_{ij}$ | $t_{ij}$ | $V_j$ | $S_{jNEW}$ | EXPLANATION |
| 0 | 0 | 0 | 0 | 0 | S set variably false |
| 0 | 0 | 0 | 1 | 1 | S set variably true |
| 0 | 0 | 1 | 0 | 1 | S set true fixed |
| 0 | 0 | 1 | 1 | 1 | S set true fixed |
| 0 | 1 | 0 | 0 | 0 | S set false fixed |
| 0 | 1 | 0 | 1 | 0 | S set false fixed |

TABLE B.1-continued

| SYSTEM STATUS CONDITION TRANSITION TRUTH TABLE | | | | | |
|---|---|---|---|---|---|
| $S_{jOLD}$ | $f_{ij}$ | $t_{ij}$ | $V_j$ | $S_{jNEW}$ | EXPLANATION |
| 0 | 1 | 1 | 0 | 0 | S unchanged |
| 0 | 1 | 1 | 1 | 0 | S unchanged |
| 1 | 0 | 0 | 0 | 0 | S set variably false |
| 1 | 0 | 0 | 1 | 1 | S set variably true |
| 1 | 0 | 1 | 0 | 1 | S set true fixed |
| 1 | 0 | 1 | 1 | 1 | S set true fixed |
| 1 | 1 | 0 | 0 | 0 | S set false fixed |
| 1 | 1 | 0 | 1 | 0 | S set false fixed |
| 1 | 1 | 1 | 0 | 1 | S unchanged |
| 1 | 1 | 1 | 1 | 1 | S unchanged |

TABLE B.2

| RESTRICTIONS ON THE RANGE OF V | | | |
|---|---|---|---|
| $t_{ij}$ | $f_{ij}$ | $S_{jNEW}$ | Implications to System Status |
| 1 | 1 | $S_{jOLD}$ | unchanged |
| 1 | 0 | 1 | set true |
| 0 | 1 | 0 | set false |
| 0 | 0 | $V_j$ | set variably |

APPENDIX C

In order to accommodate exclusive data access as well as prohibiting simultaneous activation of the same procedure in more than one processor, the single activation vector is extended so as to negate availability of data which is to be updated by a procedure. This will accommodate the equivalent of a single step function very useful in checkout phases in parallel programs. This can be done by defining a matrix whose row vectors are associated with procedures. Each $A_i$ is defined as a logical subset of the row in R associated with i. And so its definition follows from the definition of R (Appendix A) for any particular implementation.

Definition C.1. The vector $A_i$ is a set of binary status conditions $A_{ij}$, where the index j is associated with the conditions whose status is maintained in S. $A_{ij} = 1$ if and only if the $j^{th}$ condition is a mutually exclusive data availability condition required at entry to procedure i; $A_{ij} = 0$ otherwise. If $\overline{A_i}$ equals the $i^{th}$ row in R identically, then all such procedures with any entry conditions in common must execute sequentially.

Proposition C.1. Modifying the system status vector according to the formal $S = S \land \overline{A_i}$ prior to entry is sufficient to effect access protection for procedure i.

The proof of this proposition follows immediately from Definitions C.1, A.1, and A.4.

Proposition C.2. Modifying the system status vector according to the formula $S = S \quad A_i$ restores S to its original value.

Proof: The proof of this proposition follows directly from Definition C.1 and Proposition C.1 if there are no changes to S between entry and exit of the $i^{th}$ procedure. When there are other procedures initiated or terminated in the interval, the proof holds because no procedures can proceed in parallel if they are affected by or affect the same data availability condition covered by $A_i$. And therefore, for every condition for which $A_{ij} \neq 0$ there will have been no intermediate change to S and the proof is completed.

Proposition C.3. The change in system status following completion of procedure i can be computed according to the formula:

$$S = [(S \vee A_i) \wedge T_i] \vee (\overline{F_i} \wedge V_i) \vee (T_1 \wedge \overline{F_i})$$

The proof follows directly from the proofs of propositions B.1 and C.2.

What is claimed is:

1. A hardware executive apparatus for use in a multiprocessor system operable for enabling a high degree of multilevel data security, said apparatus controlling operation of a plurality of data processors for solving an algorithm defined by a plurality of application programs and a control program, said data processors connected for accessing application program memory storage means for storing said application programs and data memory storage means for storing data associated with said application programs, said data memory storage means including at least a common data memory area accessible by said plurality of data processors, said plurality of data processors generating variable status indications determined variably upon execution of said application programs, each of said application programs stored in contiguous storage locations of said application program memory storage means, said hardware executive apparatus connected to said plurality of data processors and executing said control program and comprising:

(a) a status storage means for storing current status indications $S_j$ corresponding to data conditions defined on elements of a data set appropriate for determining eligibility of the application programs, whereby said stored status indications correspond to data conditions which are relevant for enabling execution of application programs by said plurality of processors which are utilized in solving said algorithm;

(b) relevance storage means for storing groups, i, of binary relevance indications $R_{ij}$ each group corresponding to the relevance of said status indications to the $i^{th}$ one of said application programs where i is an integer designating one of said groups and corresponding one of said application programs, and j is an integer designating one of said status indications;

(c) means connected to said status storage means and connected to receive said variable status indications from said data processors for updating said current status indications stored in said status storage means at the completion of execution of each application program, each of said variable status indications having one value corresponding to and indicating satisfaction of a given one of said data conditions, and another value corresponding to and indicating non-satisfaction of said given one of said data conditions, said given data conditions being logical relationships involing at least one element of said data set, the value of said at least one element of said data set being determined by said data processors upon execution of said application programs;

(d) means connected to said relevance storage means and said status storage means for determining the eligibility of said application programs for execution by said plurality of processors;

(e) means responsive to said eligibility determining means and operatively connected to said plurality of data processors for enabling execution of eligible application programs by said plurality of data processors, said enabling means comprising:

(i) a plurality of execution address storage means for storing an entry-point execution address and program length indicator corresponding to each of said application programs, (ii) a plurality of read pointer storage means for storing at least one read pointer for defining data read address for each of said corresponding eligible application programs, and (iii) a plurality of write pointer storage means for storing at least one write pointer for defining data write address for each of said corresponding eligible application programs.

2. A hardware executive apparatus as recited in claim 1 wherein each of said plurality of read pointer storage means further has a range field for indicating the number of read pointers of said corresponding application program and wherein each of said plurality of write pointer storage means further has a range field for indicating the number of write pointers of said corresponding application programs.

3. A hardware executive apparatus as recited in claim 2, wherein said status storage means comprises a status register having bit storage positions corresponding to said status indications.

4. A hardware executive apparatus as recited in claim 3, wherein each bit storage position of said status storage register corresponds to one status indication.

5. A hardware executive apparatus as recited in claim 4, wherein said relevance storage means comprises a relevance matrix storage means wherein said groups form rows (columns) of said matrix storage means and individual binary relevance indications form columns (rows) of said matrix, each column (row) corresponding to one of said status indications on said data set and each row (column) corresponding to one of said application programs.

6. A hardware executive apparatus as recited in claim 1 or 5, wherein said means for determining the eligibility of application program i comprises means for forming a logical operation of each status indication $S_j$ with each corresponding relevance indication $R_{ij}$ to form a logic state.

7. A hardware executive apparatus as recited in claim 6, wherein said application program eligibility determining means further comprises logic means for requiring each of said logic operations to be a predetermined logic state whereby application program i is determined eligible if all current status indications $S_j$ corresponding to relevance indications $R_{ij}$ are in said predetermined logic state.

8. A hardware executive apparatus as recited in claim 7, wherein said means for updating said status indications comprises:

(a) means responsive to said data processors for sensing the completion of execution of each application program;

(b) means for storing fixed status indications (T,F) associated with each application program i, said fixed status indications determined by said algorithm independently of values associated with said data set;

(c) means for storing said variable status indications received from said data processors; and (d) said means for modifying including logic circuit means responsive to said stored current status indications, said fixed status indications and said variable status indications for generating update current status indications, said logic circuit means connected to said status storage means for storage of said update current status indications in said status storage means.

9. A hardware executive apparatus as recited in claim 8, wherein said fixed status indications (T,F) are stored in a matrix storage means, each row (column) thereof corresponding to one of said application programs, and each column (row) thereof corresponding to one of said status indications $S_j$, and said means for storing said variable status indications comprises a storage register V having bit positions corresponding to said status indications of said status storage means.

10. A hardware executive apparatus as recited in claim 9, wherein said execution address storage means, said read pointer and said write pointer storage means comprise storage registers.

11. A hardware executive apparatus as recited in claim 9, wherein said apparatus further comprises an index register for storing application program identification data, said updating means responsive to said application program identification data of said index register for identifying said application program i.

12. A hardware executive apparatus as recited in claim 1, wherein said means for updating said status indications comprises:
  (a) means responsive to said data processors for sensing the completion of execution of each application program;
  (b) means for storing fixed status indications (T,F) associated with completion of each application program i, said fixed status indications determined by said algorithm independently of values associated with said data set;
  (c) means for storing said variable status indications received from said data processors; and
  (d) said means for modifying including logic circuit means responsive to said stored current status indications, said fixed status indications and said variable status indications for generating updated current status indications, said logic circuit means connected to said status storage means for storage of said updated current status indications in said status storage means.

13. A hardware executive apparatus as recited in claim 12, wherein said fixed status indications (T, F) are stored in a matrix storage means, each row (column) thereof corresponding to one of said application programs, and each column (row) thereof corresponding to one of said status indications $S_j$, and said means for storing said variable status indications comprises a storage register V having bit positions corresponding to said binary status indications of said status storage means.

14. A hardware executive apparatus as recited in claim 12, wherein said apparatus further comprises an index register for storing application program identification data, said updating means responsive to said application program identification data of said index register for identifying said application program i.

15. A hardware executive apparatus as recited in claim 1, wherein said means for updating said status indications comprises logic circuit means responsive to said variable status indications for generating update status indications for storage in said status storage means.

16. A hardware executive apparatus as recited in claim 15, wherein said logic circuit means comprises means for allowing only selected components ($V_j$) of said variable status indications V to affect update of said status indications whereby a masking out of non-selected components is provided by said logic circuit means to thereby prevent unauthorized denial of service.

17. A hardware executive apparatus as recited in claim 16, wherein said allowing means comprises means for storing fixed status indications (T, F) associated with each application program i, said fixed status indications determined by said algorithm independently of values associated with said data set and means for combining said stored fixed status indications and said variable status indications for generating said update status indications.

18. A computer system for providing protection for multilevel secure data, said system comprising:
  (a) at least one data processor,
  (b) memory storage means operatively connected to said at least one data processor for storing application programs having at least two different execute access authorization levels, each of said application programs stored in contiguous memory locations of said application program memory storage means,
  (c) memory storage means operatively connected to said at least one data processor for storing said multilevel data, said multilevel data having at least two different classification levels corresponding to said access authorization levels of said application programs,
  (d) a hardware system controller connected to and separate from said at least one data processor for providing sole access authorization for said at least one data processor to said application program memory storage means and said multilevel data memory storage means, said system controller comprising:
    (1) means for storing indications of the status of a plurality of data conditions which collectively enable execution of said application programs,
    (2) means for storing indications of the relevance of each of said status indications corresponding to each of said application programs,
    (3) means connected to said status storing means and responsive to said data processors for updating said status indications upon execution of said application programs,
    (4) means for enabling execution of said application programs in response to said updated status indications and corresponding relevance indications, said enabling means including:
      (i) a plurality of execution descriptor registers for storing program starting addresses for each of said plurality of application programs,
      (ii) a plurality of write descriptor registers for storing a data write pointer for each of said application programs, and
      (iii) a plurality of read descriptor registers for storing a data read pointer for each of said application programs.

19. A computer system as recited in claim 18, wherein:

(a) said data read and data write pointers provide an intermediate data address to said multilevel data for said at least one data processor, and (b) said application programs of said at least one data processor having sequential code eliminating any request basis for access permission by said at least one data processor.

20. A computer system as recited in claim 18, wherein said at least one data processor has an instruction repertoire limited to GO-TO-LESS instruction code, said application programs having sequentially coded instructions.

21. A computer system as recited in claim 18, further comprising means for ensuring limitation of execution access of said at least one data processor to said application programs having starting addresses specified in said execution registers of said system controller.

22. A computer system as recited in claim 21, wherein said plurality of read and write descriptor registers have a range field for specifying a range of consecutively stored read and write pointer addresses for each of said application programs.

23. A computer system as recited in claim 18 or 22, wherein said data read and data write pointers identify intermediate pointer packets having at least one intermediate pointer for providing addresses of said read and write data, each intermediate pointer having a base field and a range field for specifying the starting address and range of contiguous memory locations of said read and write data locations.

24. A computing system operable for enabling a high degree of multilevel secure data processing operation and solving a computational problem by execution of a plurality of application programs and a control program, said system comprising:

(a) a plurality of data processors connected for accessing application program memory storage means storing said plurality of application programs and data memory storage means storing data elements, said data memory storage means having at least a data memory area commonly accessible by said plurality of data processors, at least one of said data processors generating at least one variable status indication determined variably upon execution of at least one of said plurality of application programs;

(b) a system controller operable for execution of said control program and including:

(1) a status register for storing status indications of a plurality of data conditions appropriate for determining eligibility of said plurality of application programs solving said computational problem, each application program stored in contiguous storage locations of said application program memory storage means;

(2) a relevance matrix store for storing indications of the relevance of each data condition to each of said plurality of application programs;

(3) means connected to said status register and responsive to said at least one variable status indication for updating said status indications of said status register, said at least one variable status indication indicating satisfaction of a specified data condition, said specified data condition being a logical relationship involving at least one of said data elements, said at least one data element having a value determined by said at least one data processor upon execution of said at least one application program, said specified data condition corresponding to other than a program termination event;

(4) means for storing a plurality of execution addresses corresponding to beginning addresses of said plurality of application programs;

(5) means for storing at least one write data pointer corresponding to each of said plurality of execution addresses and thus corresponding to each of said application programs, said write data pointer enabling data write access into said data memory storage means by said corresponding application program;

(6) means for storing at least one read data pointer corresponding to each of said plurality of execution addresses and thus corresponding to each of said application programs, said read data pointer enabling data read access of said data memory storage means by said corresponding application program;

(7) means responsive to said status indications of said status register, said corresponding relevance indications of said relevance matrix store for determining the eligibility of said plurality of application programs for execution by said plurality of data processors and for generating for application programs determined to be eligible (1) execution addresses from said execution address storage means, (2) write pointer addresses from said write data pointer storing means, and (3) read pointer addresses from said read data pointer storing means; and (c) said execution addresses, data write, and data read pointer addresses providing the only application program access authorization to and from said program and data memory storage means, whereby a high degree of multilevel data security may be maintained by eliminating execute, data read and data write access authorization from control by said plurality of data processors.

25. A computing system as recited in claim 24, further comprising interface means connected between said plurality of data processors and said system controller, said interface means comprising:

(a) an execution register for storing application program execution addresses generated by said system controller;

(b) a write register for storing the write pointer addresses generated by said system controller and corresponding to said execution addresses stored in said execution register, (c) a read register for storing the read pointer addresses generated by said system controller and corresponding to said execution addresses stored in said execution register, and (d) said data processors having read only access to said execution, write and read registers, whereby said registers are protected from modification by said data processors for improving security of said computing system.

26. A computing system as recited in claim 25, wherein said interface means further comprises a multiport controller and a plurality of execution, write and read registers corresponding to said plurality of data processors.

27. A computing system as recited in claim 26 wherein said interface means further comprises an index register for identifying application programs at the completion of execution by said data processors.

28. A computing system as recited in claim 27, wherein said interface means comprises a binary mode indication register loaded by said data processors for identifying entry and exit modes of operation:

said system controller operable in said entry mode of operation in response to loading of said mode indication register by the $k^{th}$ one of said plurality of data processors for determining eligibility of the $i^{th}$ one of said plurality of application programs for execution by said $k^{th}$ data processor and for generating a beginning address for storage in said execute register of said interface means for loading by said $k^{th}$ data processor whereby said $k^{th}$ data processor executes said $i^{th}$ application program; and said system controller operable in said exit mode in response to loading of said mode indication register by said $k^{th}$ data processor for receiving application program identifying data of said $i^{th}$ application program loaded by said $k^{th}$ data processor into said index register of said interface means for enabling said updating means of said system controller to update said status register, said $k^{th}$ data processor identifying changes of the binary status of said data conditions as a result of execution of said $i^{th}$ application program, wherein k is an integer designating one of said data processors and i is an integer designating one of said application programs.

29. A computing system as recited in claim 28, wherein said system controller further comprises:

means for storing fixed status modifying indications (T,F) for modifying said status storage register upon completion of execution of said $i^{th}$ application program, said fixed status modifying indications determined by said computational problem to be solved independent of data values computed in said $k^{th}$ data processor;

said interface means further comprising means for storing said variable status indications (V) associated with completion of said $i^{th}$ application program, said variable status modifying indications determined by said data values computed in said $k^{th}$ data processor, and wherein said updating means receives said fixed status indications and said variable status indications for determining updated status indications of said data conditions and for storing same in said status register.

30. A computing system as recited in claim 29, wherein said system controller further comprises logic circuit means for allowing only designated components $V_j$ of said variable status indications V to affect update of said status indications whereby a masking out of non-selected components is provided by said logic circuit means to thereby prevent unauthorized denial of service.

31. A computing system as recited in claim 24, further comprising an interface means connected between said system controller and said plurality of data processors wherein said interface means comprises a binary mode indication register loaded by said data processors for identifying entry and exit modes of operation;

said system controller operable in said entry mode of operation in response to loading of said mode indication register by the $k^{th}$ one of said plurality of data processors for determining eligibility of the $i^{th}$ one of said plurality of application programs for execution by said $k^{th}$ data processor and for generating a beginning address for loading by said $k^{th}$ data processor whereby said $k^{th}$ data processor executes said $i^{th}$ application program; and said system controller operable in said exit mode in response to loading of said mode indication register by said $k^{th}$ data processor for receiving application program identifying data of said $i^{th}$ application program for enabling said updating means of said system controller to update said status register, said $k^{th}$ data processor identifying changes of the binary status of said data conditions as a result of execution of said $i^{th}$ application program, wherein k is an integer designating one of said data processors and i is an integer designating one of said application programs.

32. A computing system as recited in claim 31, wherein said system controller further comprises:

means for storing fixed status modifying indications (T,F) for modifying said status storage register upon completion of execution of said $i^{th}$ application program, said fixed status indications determined by said computational problem to be solved independent of data values computed in said $k^{th}$ data processor; and means for storing said variable status indications (V) associated with completion of said $i^{th}$ application program, said variable status indications determined by said data values computed in said $k^{th}$ data processor, said updating means receiving said fixed status indications and said variable status indications for determining updated binary status indications of said data conditions and for storing same in said status register.

33. A computing system as recited in claim 32, wherein said system controller further comprises logic circuit means for allowing only designated components $V_j$ of said variable status indications V to affect update of said status indications whereby masking out of non-selected components is provided by said logic circuit means to thereby prevent unauthorized denial of service.

34. A computing system as recited in claim 24, wherein said system controller further comprises a busy/not busy binary indicator register for indicating whether the system controller is busy/not busy upon request for access to said system controller by said data processors.

35. A computing system as recited in claim 24, wherein said write data pointer specifies an address of an intermediate pointer which defines an absolute access location in said data memory storage means.

36. A computing system as recited in claim 24, wherein said read data pointer specifies an address of an intermediate pointer which defines an absolute access location in said data memory storage means.

37. A computing system as recited in claim 24 wherein said write data pointer storing means has a range field for specifying an integer corresponding to the number of a plurality of intermediate write data pointers and an address field specifying one address of said plurality of intermediate write data pointers, said processors operable for adding displacement values to said one write data pointer address to obtain addresses of said plurality of intermediate data pointers which define absolute access locations in said data memory storage means, said displacement values, added by said processors being less than or equal to said integer.

38. A computing system as recited in claim 24 wherein said read data pointer storing means has a range field for specifying an integer corresponding to the number of a plurality of intermediate read data pointers and an address field specifying one address of said plurality of intermediate read data pointers, said processors operable for adding displacement values to said one read data pointer address to obtain addresses of said plurality of intermediate read data pointers which define absolute access locations in said data memory storage means, said displacement values added by said processor being less than or equal to said integer.

39. A computing system as recited in claim 24 wherein each of said execution address storing means has a range field for specifying the number of program instructions in said corresponding application program and an address field specifying the beginning address of said corresponding application program, said processor operable for incrementing the execution address by a unit instruction increment after each execution access to said application program memory storage means up to a maximum value defined by said execution range field.

40. A computing system as recited in claim 21 wherein said write data pointer storing means has a range field for specifying an integer corresponding to the number of a plurality of intermediate write data pointers and an address field specifying one address of said plurality of intermediate write data pointers, said processors operable for adding displacement values to said one write data pointer address to obtain addresses of said plurality of intermediate data pointers which define absolute access locations in said data memory storage means, said displacement values, added by said processors being less than or equal to said integer.

41. A computing system as recited in claim 31 wherein said read data pointer storing means has a range field for specifying an integer corresponding to the number of a plurality of intermediate read data pointers and an address field specifying one address of said plurality of intermediate read data pointers, said processors operable for adding displacement values to said one read data pointer address to obtain address of said plurality of intermediate read data pointers which define absolute access locations in said data memory storage means, said displacement values added by said processor being less than or equal to said integer.

42. A computing system as recited in claim 37, 38, 40 or 41, wherein each of said intermediate write data pointers and intermediate read data pointers have a base field and a range field for specifying the starting address and range of contiguous memory locations of said read and write data locations whereby array addressing may be provided by said processors.

43. A multilevel secure computing machine operable for transitioning between different states for solving an algorithm and comprising:
  (a) data processing means including means for computing data in accordance with event-driven application programs and means for generating at least one variable status signal corresponding to other than a program termination event and representing satisfaction of at least one logic condition dependent upon at least one non-predetermined value of data processed by said data processing means;
  (b) memory storage means accessible by said data processing means for storing said application programs, and for storing data for use with and resulting from execution of said application programs, each of said application programs stored in contiguous memory locations of said memory storage means;
  (c) hardware executive means connected to said data processing means and operable for scheduling said application programs and comprising:
    (i) means for storing indications of the status of a plurality of data conditions including said at least one logic condition which collectively enable execution of said application programs;
    (ii) means for storing indications of the relevance of each of said status indications corresponding to each of said application programs;
    (iii) means connected to said status storing means and responsive at least to said variable status signal for updating said status indications upon execution of said application programs, said updating means including means for modifying a plurality of said status indications in response to completion of execution of at least one of said application programs;
    (iv) means for enabling execution of said application programs in response to said status indications and said corresponding relevance indications, said enabling means comprising:
      (1) a plurality of execution registers for providing starting addresses for said application programs to be executed and
      (2) a plurality of read and write pointer registers for providing data read and write pointer addresses corresponding to said application programs, and
  (d) said data processing means having execute, read and write access to said memory storage means only as specified by said plurality of execution, read and write registers.

44. A method of increasing multilevel data security in a plurality of data processors forming a computing system comprising the steps of:
  (a) structuring the programming of an algorithm to be carried out by said computing system in a plurality of data transformation programs and a control program, said data transformation programs performing event-driven data computational steps without transfer of control to other data transformation programs and said control program scheduling execution of said data transformational steps;
  (b) selecting a plurality of unary predicates which collectively represent all data conditions relevant to enabling execution of all of said data transformation programs, and forming status indications for said unary predicates;
  (c) designating all of said unary predicates which are relevant to enabling the execution of each of said data transformation programs, said designated unary predicates forming a group of relevance indications corresponding to each data transformation program;
  (d) storing said data transformation programs in memory storage means accessible by said plurality of data processors;
  (e) storing said control program in a hardware executive apparatus and scheduling said data transformation programs by:
    (i) maintaining a memory store of said status indications;
    (ii) maintaining a memory store of each group of relevance indications;

(iii) determining eligibility of data transformation programs by hardware logic operations on said status and relevance memory stores wherein a data transformation program is determined eligible for execution if all status indications are in a specific logic state which are relevant in the group of relevance indications corresponding to said data transformation program;

(iv) enabling said eligible programs whereby concurrently eligible data transformation programs may be executed concurrently, said enabling step including the steps of:

(1) storing in storage means starting addresses corresponding to all of said data transformation programs;

(2) generating starting addresses from said storage means corresponding to eligible transformation programs;

(3) transmitting said generated starting addresses to a protected execution register of a non-busy data processor, said protected execution register being read only accessible by said non-busy processor;

(4) storing in storage means data pointer addresses for data read and write operations of said data transformation programs;

(5) generating data pointer addresses from said read and write storage means corresponding to eligible data transformation programs; and (6) transmitting said generated data pointer read and write addresses to protected read and write registers of non-busy data processors, and protected read and write registers being read-only accessible by said data processors;

(v) updating said memory storage of said status indications upon completion of execution of each data transformation program;

(vi) repeating steps (iii) through (v) until data transformation programs are no longer determined eligible whereby said algorithm is completed by said computing system.

45. A method of increasing security in a uniprocessor comprising the steps of:

(a) structuring the programming of an algorithm to be carried out by said uniprocessor into a plurality of data transformation programs and a control program, said data transformation programs performing event-driven data computational steps and said control program scheduling execution of said data computational steps;

(b) selecting a plurality of unary predicates which collectively represent all data conditions relevant to enabling execution of all of said data transformation programs, said unary predicates forming status indications of said data conditions;

(c) designating all of said unary predicates which are relevant to enabling the execution of each of said data transformation programs, said designated unary predicates forming a group of relevance indications corresponding to each data transformation program;

(d) storing said data transformation programs in memory storage devices accessible by said uniprocessor;

(e) storing said control program in a hardware executive apparatus and scheduling said data transformation programs by:

(i) maintaining a memory store of said status indications;

(ii) maintaining a memory store of each group of relevance indications;

(iii) determining eligibility of data transformation programs by hardware logic operations on said status and relevance memory stores wherein a data transformation program is determined eligible for execution if all status indications are in a predetermined logic state which are relevant in the group of relevance indications corresponding to said data transformation program;

(iv) enabling said eligible programs by:

(1) storing in storage means starting addresses corresponding to all of said data transformation programs;

(2) generating starting addresses from said storage means corresponding to eligible transformation programs;

(3) transmitting said generated starting addresses to a protected execution register, said protected execution register being read-only accessible by said uniprocessor;

(4) storing in storage means data pointer addresses for data read and write operations of said data transformation programs;

(5) generating data pointer addresses from said read and write storage means corresponding to eligible data transformation programs; and (6) transmitting said generated data pointer read and write addresses to protected read and write registers of non-busy data processors, said protected read and write registers being read-only accessible by said data processors;

(v) updating said memory storage of said status indications upon completion of execution of each data transformation program;

(vi) repeating steps (iii) through (v) until data transformation programs are no longer determined eligible whereby said algorithm is completed by said computing system.

46. A method of structuring the architecture of a computing system for solving a computational problem and maintaining a high degree of multilevel data security by utilizing a hardware executive as a reference monitor and requirements-oriented programming to enhance the certifiability of systems comprising the steps of:

(a) structuring the programming of said computational problem to be carried out by said computing system into a plurality of data transformation programs and a control program, said daa transformation programs performing event-driven data computational steps without transfer of control to other transformation programs and said control program scheduling execution of said data computational steps;

(b) selecting a plurality of unary predicates which collectively represent all data conditions relevant to enabling execution of all of said data transformation programs, said unary predicates forming status indications of said data conditions;

(c) designating all of said unary predicates which are relevant to enabling the execution of each of said data transformation programs, said designated unary predicates forming a group of relevance indications corresponding to each data transformation program;

(d) storing said data transformation programs in memory storage devices;
(e) storing said control program in a hardware executive apparatus and scheduling said data transformation programs by:
  (i) maintaining a memory store of said status indications;
  (ii) maintaining a memory store of each group of relevance indications;
  (iii) determining eligibility of data transformation programs by hardware logic operations on said status and relevance memory stores wherein a data transformation program is determined eligible for execution if all status indications are in a predetermined logic state which are relevant in the group of relevance indications corresponding to said data transformation program;
  (iv) enabling said eligible programs by:
    (1) storing in storage means starting addresses corresponding to all of said data transformation programs;
    (2) generating starting addresses from said storage means corresponding to eligible transformation programs;
    (3) transmitting said generated started addresses to a protected execution register of said computing system, said protected execution register being read-only accessible by said computing system;
    (4) storing in storage means data pointer addresses for data read and write operations of said data transformation programs;
    (5) generating data pointer addresses from said read and write storage means corresponding to eligible data transformation programs; and
    (6) transmitting said generated data pointer read and write addresses to protected read and write registers of said computing system, said protected read and write registers being read-only accessible by said computing system;
  (v) updating said memory storage of said status indications upon completion of execution of each data transformation program;
  (vi) repeating steps (iii) through (v) until data transformation programs are no longer determined eligible whereby said algorithm is completed by said computing system.

* * * * *